US007095430B2

(12) United States Patent
Kato et al.

(10) Patent No.: US 7,095,430 B2
(45) Date of Patent: Aug. 22, 2006

(54) IMAGE EXPOSING APPARATUS AND IMAGE EXPOSING METHOD

(75) Inventors: Kiichi Kato, Kanagawa (JP); Yoshinori Morimoto, Kanagawa (JP); Kenji Matsumoto, Kanagawa (JP); Toshiro Hayakawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 178 days.

(21) Appl. No.: 10/328,179

(22) Filed: Dec. 26, 2002

(65) Prior Publication Data

US 2003/0179281 A1 Sep. 25, 2003

(30) Foreign Application Priority Data

Dec. 27, 2001 (JP) ............................. 2001-398415
Dec. 27, 2001 (JP) ............................. 2001-398418

(51) Int. Cl.
*B41J 2/435* (2006.01)

(52) U.S. Cl. ....................................... 347/236; 347/246
(58) Field of Classification Search ................ 347/232, 347/236–237, 241, 246–247, 256, 135, 253, 347/225, 130, 132, 143–144; 359/196, 204, 359/212, 634
See application file for complete search history.

(56) References Cited

U.S. PATENT DOCUMENTS

| 4,805,973 | A | * | 2/1989 | Watanabe ................... 359/212 |
| 5,220,356 | A | * | 6/1993 | Yaginuma ................... 347/225 |
| 5,748,352 | A | * | 5/1998 | Hattori ........................ 359/196 |
| 6,275,248 | B1 | * | 8/2001 | Nakamura et al. .......... 347/232 |
| 6,388,694 | B1 | * | 5/2002 | Fujita .......................... 347/236 |
| 6,606,180 | B1 | * | 8/2003 | Harada ........................ 359/204 |
| 6,624,949 | B1 | * | 9/2003 | Roddy et al. ............... 359/634 |

FOREIGN PATENT DOCUMENTS

JP 10193679 A * 7/1998

OTHER PUBLICATIONS

Shin-Ichi Nagahama, et al./HIGH POWER and LONG-LIFETIME InGan Multi-Quantum-Well Laser Diodes Grown on Low-Dislocation-Density GaN Substrates/ Jpn. J. Appl. Phys. vol. 39 (2000) pp. L 647-L 650 Part 2, No. 7A, Jul. 2000 The Japan Society of Applied Physics.
Matsushita, OPTRONICS (2000) No. 1 pp. 62-67.

* cited by examiner

*Primary Examiner*—Hai Pham
(74) *Attorney, Agent, or Firm*—Sughrue Mion, PLLC

(57) ABSTRACT

In an image exposing apparatus and an image exposing method, a deterioration of an image quality caused by stray light is suppressed, while both a sensitive level and a non-sensitive level are properly set in accordance with a type of photosensitive material. In the image exposing apparatus, a recording level setting unit calculates a recording level corresponding to a light amount level stored in a recording level light amount memory and sets the calculated recording level. A non-recording level setting unit calculates a non-recording level from an extinction ratio, which corresponds to a type of photosensitive material stored in a photosensitive material information memory, and the recording level. An output voltage setting unit sets an output voltage such that a detected voltage becomes equal to one of the recording level and the non-recording level.

11 Claims, 16 Drawing Sheets

F I G . 5
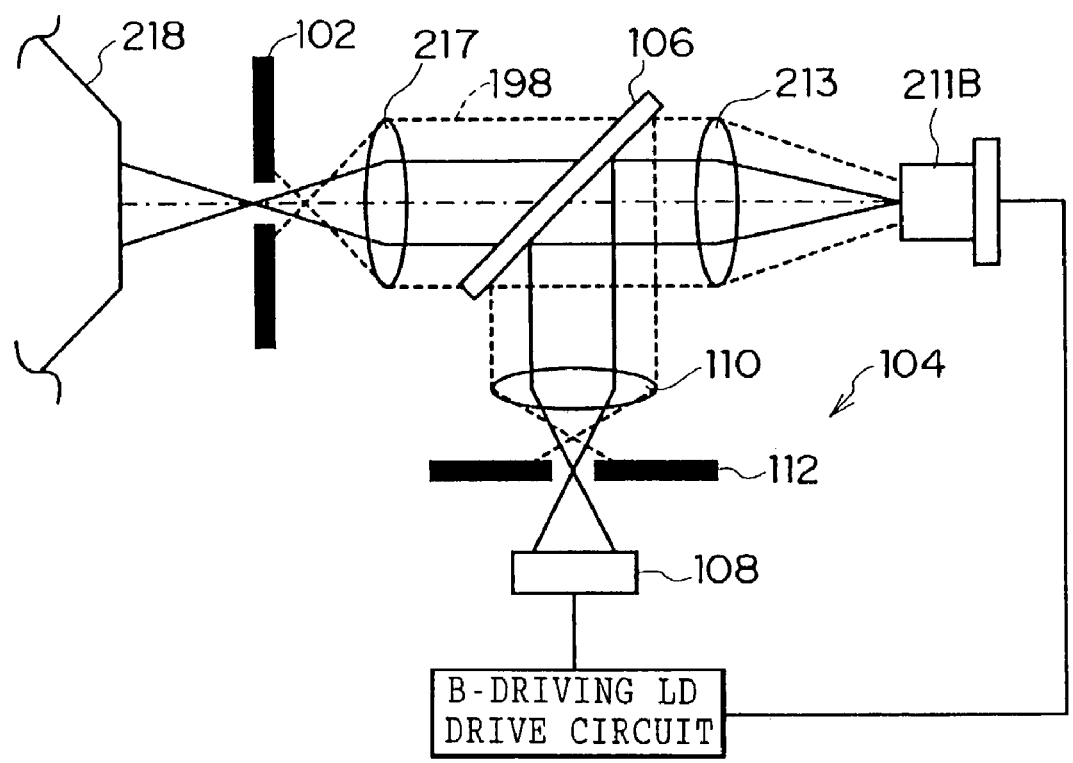

SCANNING DIRECTION

194

200

IMAGE EXPOSING APPARATUS AND IMAGE EXPOSING METHOD

BACKGROUND OF THE INVENTION

1. Field of the Invention

The present invention relates to an image exposing apparatus and an image exposing method. More specifically, the invention is directed to an image exposing apparatus and an image exposing method using the apparatus, the apparatus comprises a GaN-based semiconductor laser, and scans over a recording material such as a photosensitive material using an optical beam modulated in response to an image so as to expose the scanned recording material.

2. Description of the Related Art

Conventionally, an image exposing apparatus has been proposed which a optically scans over recording materials with a light source apparatus that employs either a semiconductor laser or an edge emitting type LED (Superluminescent light emitting diode (SLD) etc.) to form images on the scanned upper portions of the recording materials. In the semiconductor laser, GaAs substrate-shaped AlGaInP, AlGaAs, and InGaAsP are employed as structural materials.

In the light source apparatus, which employs the above-described materials, the GaAs which constitutes the substrate is an absorbing material with respect to light emitting wavelengths, and further, a light absorbing material such as InGaAs is employed in a counter electrode. As a result, while the light is independently confined within a light emitting region having a width of, normally, several micrometers, there is a relatively small amount of stray light within regions other than a stripe region due to the effect of the above-described absorbing material.

On the other hand, very recently, in semiconductor lasers, or edge emitting type LEDs, which employ GaN (gallium nitride) material series, and can be gradually used in practical fields, sapphire and SiC are used as substrates. These substrates are transparent with respect to light emitting wavelengths. As a result, stray lights which reaches an edge of a chip, is returned to a region in the vicinity of an activated region by reflections, and this stray light is transmitted through the substrate by a plurality of reflections, so that stray light having various patterns may be produced.

FIG. 9 shows a schematic diagram in the case that such a GaN-based semiconductor laser is employed in a light source of a silver salt type exposing apparatus for performing a spot scanning operation on a silver salt photosensitive material with a polygon mirror and the like.

As shown in FIG. 9, laser light emitted from a GaN-based semiconductor laser 190 is collected by a collective lens 192 to obtain an optical light spot 194 having a predetermined size. However, stray light (so-called "EL light") 198, the light emitting position and light emitting direction of which are at random, cannot be collected at the spot 194, but may form a blurred pattern 200.

FIG. 10 shows both a relationship between an optical output and a drive current of the spot 194 and a relationship between an optical output and a drive current of the blurred pattern 200. As shown in FIG. 10, in particular, within such a low exposure intensity region of approximately 0.05 mW, which is important in a silver salt exposing system, it can be seen that substantially high power is present in the blurred pattern 200.

In a high-grade silver salt type exposing system having a very high sensitivity as compared with an electro-photographic system using a photosensitive material such as a photosensitive drum, a photosensitive material maybe reacted by this blurred pattern 200, namely the stray light (EL light), causing a fatal defect. For example, in the case that a pattern (for example, stripe pattern and the like shown in FIG. 11A) is formed having a line width substantially equal to the line width of the spot 194, an image is originally formed in a stripe shape, as represented in FIG. 11A. However, image portions among the stripes are colored by the above-explained blurred pattern 200, so that as indicated in FIG. 11B, such an image would be formed, the image quality of which is considerably lowered and the sharpness of which is lowered, and this image of FIG. 11B is different from an expected image.

Since a light amount of a blurred pattern, which is caused by stray light (EL light), is small, problems in area gradation, such as those in an electro-photographic system, seldom arise. However, as to such a photosensitive material having continuous gradation in which a non-sensitive level is very low, such as a silver salt photograph, a very weak background may introduce a blurring of characters and images, which may considerably lower image grades.

Thus, in the silver salt type exposing system especially having the feature of the high-quality image, a reduction of the stray light, which specifically occurs in the GaN-based semiconductor laser, and may have an adverse serious and fatal influence on the images, is required.

Also, as shown in FIG. 12A, in a conventional semiconductor laser other than a GaN-based semiconductor laser, LED-light emission is relatively weak. In the case when the laser light of this conventional semiconductor laser is intensity-binary modulated, such as by pulse width modulation (PWM), if an OFF level is previously set such that a laser drive current becomes no more than a predetermined threshold value "Ith", a sufficiently high extinction ratio (namely, a ratio of a sensitivity level, at which photosensitive material is sensitive to a predetermined level, to non-sensitive level, at which photosensitive material is not sensitive) can be obtained, and thus, photosensitive materials are not sensitive at the non-sensitive level.

On the other hand, as shown in FIG. 12B, in a GaN-based semiconductor laser, since there is such a region where LED light emission is relatively strong even when a laser drive current is no more than the conventional threshold value Ith, a sufficiently high extinction ratio cannot be obtained. Also, LED-emitted light leaks from a waveguide path, and an entire crystal edge plane emits light. This emitted light may be attenuated while this emitted light passes through an optical system. However, a light amount, which cannot be ignored, may become the above-explained stray light in the vicinity of a predetermined spot of an optical beam and may be present on a photosensitive material. As a result, since the same place is exposed by this stray light plural times, there are some cases in which unexpected color development may occur.

In this case, if the laser drive current at the non-sensitive level is simply set to 0 mA, then the sufficiently high extinction ratio can be obtained and thus the extra color development can be suppressed even for the GaN-based semiconductor laser. However, in this case, a current difference between the sensitive level and the non-sensitive level may increases excessively, such that high-speed modulation cannot be carried out, and a load of a modulation circuit may also be increased.

Further, since photosensitive characteristics differ depending on the type of photosensitive materials, if a sensitive level and a non-sensitive level are set using a specific photosensitive material as a reference, then there are some possibilities that images might not be able to be recorded on these photosensitive materials properly.

SUMMARY OF THE INVENTION

An object of the present invention is to provide an image exposing apparatus and an image exposing method, capable of setting both a sensitive level and a non-sensitive level in a proper manner in response to a type of photosensitive material so as to suppress a deterioration of an image quality caused by stray light.

Another object of the invention is to provide an image exposing apparatus and an image exposing method, capable of suppressing a deterioration of a sharpness of an image caused by stray light.

To achieve the above-described objects, an image exposing apparatus, according to a first aspect of the invention, comprising: a GaN-based semiconductor laser for emitting an optical beam, which includes laser light and emitted light other than the laser light; an optical system for focusing the optical beam onto a photosensitive material; a scanning and exposing component for scanning and exposing the photosensitive material with an optical beam, which has been modulated in accordance with image data to be recorded; an input component for inputting a type of the photosensitive material; a setting component for setting both a sensitive level at which the photosensitive material is sensitized and a non-sensitive level at which the photosensitive material is not sensitized in accordance with the type of the photosensitive material; and a driving component for driving the GaN-based semiconductor laser such that a light amount of an optical beam irradiated onto the photosensitive material becomes one of at least equal to, the sensitive level and no more than equal to the non-sensitive level in accordance with the image data.

Both the laser light and the emitted light other than the laser light are contained in the optical beam emitted from the GaN-based semiconductor laser. The emitted light corresponds to such light, which transmits a substrate of the GaN-based semiconductor laser and is projected outside this GaN-based semiconductor laser. This emitted light constitutes stray light, which may cause lowering of an image quality.

The optical beam emitted from the GaN-based semiconductor laser is focused onto the photosensitive material by the optical system arranged by containing a predetermined lens and the like.

The scanning and exposing component scans and exposes the photosensitive material by the optical beam, which has been modulated in response to the image data. This scanning and exposing component is arranged by containing a polygon mirror and the like.

The setting component sets both the sensitive level at which the photosensitive material is sensitized and the non-sensitive level at which the photosensitive material is not sensitized in accordance with the type of the photosensitive material which is entered by the input component. As to the type of this photosensitive material, such a type of photosensitive material, which has been previously stored in a memory, may be entered. Alternatively, such a type of photosensitive material may be entered by an operator.

As explained above, since not only the sensitive level but also the non-sensitive level is set in accordance with the type of this photosensitive material, it is possible to avoid such a fact that the image quality is changed in accordance with this type of photosensitive material.

The driving component for driving the GaN-based semiconductor laser in such a manner that the light amount of the optical beam irradiated to the photosensitive material becomes higher than, or equal to the sensitive level, or lower than, or equal to the non-sensitive level in response to the image data. At this time, the driving component preferably drives the GaN-based semiconductor laser in such a manner that, for example, a ratio of the sensitive level to the non-sensitive level becomes constant, and also a difference between the sensitive level and the non-sensitive level is decreased. As a result, the driving component can switch the sensitive level and the non-sensitive level in a high speed, so that the load of the driving component can be reduced.

The setting component comprises: a ratio storage component which stores thereinto a ratio of a first preset reference sensitive level at which the photosensitive material is sensitized by a predetermined level to a second preset reference sensitive level at which the photosensitive material is not sensitized in accordance with the type of the photosensitive material; and a sensitive level inputting component for inputting a measuring sensitive level which is determined based upon a colorimetry result of a test pattern recorded on the photosensitive material in such a manner that the photosensitive material is sensitized; and the setting component sets the measuring sensitive level as the sensitive level, and calculates the non-sensitive level from both the ratio and the sensitive level corresponding to the type of the photosensitive material to set the calculated non-sensitive level.

In the ratio storage component, the ratio of the first preset reference sensitive level at which the photosensitive material is sensitized by the predetermined level to the second preset reference sensitive level at which the photosensitive material is not sensitized, namely an extinction ratio is stored in accordance with the type of the photosensitive material.

In the setting component, the measuring sensitive level entered by the input component is set as the sensitive level.

The measuring sensitive level is determined based upon the colorimetry result of the test pattern recorded on the photosensitive material on the photosensitive material in such a manner that the photosensitive material is sensitized. For instance, while a test pattern is colorimetry-measured by a colorimetring component, such a sensitive level at which this colorimetry level becomes, for instance, density having a predetermined level may be determined as the measuring sensitive level. It should be understood that the test pattern may be visibly measured not by employing this colorimetring component so as to set the measuring sensitive level.

Then, the setting component reads out a ratio corresponding to a type of a photosensitive material from the ratio storage component, and calculates the non-sensitive level from both the read ratio and the set sensitive level, namely the measuring sensitive level to set the calculated non-sensitive level.

As previously explained, since the sensitive level is set to the measuring sensitive level, both the optimum sensitive level and the optimum non-sensitive level can be set irrespective of the fluctuation in the photosensitive material and the degradation over time of the apparatus.

Also, the image exposing apparatus further comprises: a monitoring optical system for monitoring the optical beam; and a light receiving component for receiving an optical beam transmitted the monitoring optical system; wherein, the monitoring optical system is arranged in such a manner that a component ratio of the laser light of the optical beam received by the light receiving component to the emitted light is substantially equal to the component ratio on the photosensitive material; and the driving component may drive the GaN-based semiconductor laser in such a manner that a light amount of an optical beam received by the light receiving component becomes equal to either the sensitive level or the non-sensitive level.

The monitoring optical system branches the optical beam emitted from the GaN-based semiconductor laser along the direction of the light receiving component. Since the monitoring optical system is arranged in such a manner that the component ratio of the laser light of the optical beam received by the light receiving component to the emitted light is substantially equal to the component ratio on the photosensitive material, the light amount of the optical beam can be correctly received by the light receiving component.

The driving component drives the GaN-based semiconductor laser in such a manner that the light amount of the optical beam received by the light receiving component becomes equal to either the sensitive level or the non-sensitive level.

As previously explained, in the light receiving component, since such an optical beam can be detected which is substantially equal to the optical beam on the photosensitive material, the GaN-based semiconductor laser can be driven in a more correct manner, so that it is possible to avoid lowering of the image quality.

To achieve the above-described objects, an image exposing apparatus, according to a second aspect of the invention, comprises: a GaN-based semiconductor laser for emitting an optical beam which contains laser light and emitted light other than the laser light; an optical system for focusing the optical beam onto a photosensitive material; a scanning and exposing component for scanning and exposing the photosensitive material by an optical beam in accordance with image data to be recorded; and a driving component for supplying a drive current to the GaN-based semiconductor laser for each pixel data of image data, which drive current includes a first drive current that is higher than a predetermined drive current, and a second drive current that is lower than the predetermined drive current at least once within a supply time period during which the predetermined drive current should be supplied to the GaN-based semiconductor laser.

Both the laser light and the emitted light other than the laser light are contained in the optical beam emitted from the GaN-based semiconductor laser. The emitted light corresponds to such light, which transmits a substrate of the GaN-based semiconductor laser and is projected outside this GaN-based semiconductor laser. This emitted light constitutes stray light, which may cause lowering of an image quality.

The optical beam emitted from the GaN-based semiconductor laser is focused onto the photosensitive material by the optical system arranged by containing a predetermined lens and the like.

The scanning and exposing component scans and exposes the photosensitive material by the optical beam, which has been modulated in response to the image data. This scanning and exposing component is arranged by containing a polygon mirror and the like.

The driving component supplies to the GaN-based semiconductor laser, such a drive current which contains both the first drive current higher than the predetermined drive current, and the second drive current lower than the predetermined drive current at least one time within the supply time period during which the predetermined drive current should be supplied to the GaN-based semiconductor laser in response to pixel data as to each of the pixel data of the image data, namely within a scanning time period per a single pixel. It should be noted that in this case, the image data implies a set of pixel data of each pixel.

In other words, under normal operation, when a pixel is formed, a predetermined drive current corresponding to pixel data is supplied to a semiconductor laser in a fixed manner within a supply time period. However, in such a semiconductor laser as a GaN-based semiconductor laser having a large amount of emitted light, if a constant drive current is supplied to this semiconductor laser, then a ratio of emitted light is increased which may conduct lowering of an image quality in such a case that a low drive current is employed.

As a consequence, the driving component does not supply a constant drive current, but supplies the drive current which contains both the first drive current higher than the preselected drive current and also the second drive current lower than the preselected drive current. Also, since there is such a tendency that the emitted light is saturated in accordance with the increase of the drive current, the driving component supplies both the first drive current higher than the predetermined drive current and the second drive current lower than the predetermined drive current, so that a ratio of the entire emitted light can be lowered. As a consequence, lowering of the image quality caused by the emitted light can be suppressed.

It should also be understood that the driving component may preferably drive the GaN-based semiconductor laser in such a manner that an average value of light energy supplied to the photographic material when the predetermined drive current is made constant and the constant drive current is supplied to the GaN-based semiconductor laser within the supply time period is made coincident with an average value of light energy supplied to the photosensitive material when a drive current is supplied to the GaN-based semiconductor laser within the supply time period, while the drive current contains the first drive current higher than the predetermined drive current, and also contains the second drive current lower than the predetermined drive current.

Also, the driving component may produce the drive current by superimposing a high frequency signal having a predetermined frequency on an image signal in correspondence with the image data. In other words, the image signal is modulated by the high frequency signal having the predetermined frequency. In this case, the drive current may be produced by a simple arrangement.

It should also be noted that the above-described predetermined frequency may be preferably set to such a frequency defined by multiplying a frequency of the image signal by an integer, or a frequency within a preselected range containing the frequency of the image signal multiplied by the integer.

In this case, the frequency of the image signal may be obtained as an inverse number of a scanning time period per a single pixel. Then, since the frequency of the high frequency signal is selected to be such a frequency defined by multiplying the frequency of the image signal by the integer, the average value of the light energy supplied to the photographic material when the predetermined drive current is made constant and the constant drive current is supplied to the GaN-based semiconductor laser within the supply time period is made coincident with the average value of the light energy supplied to the photosensitive material when the drive current is supplied to the GaN-based semiconductor laser within the supply time period, while this drive current contains the first drive current higher than the predetermined drive current, and also contains the second drive current lower than the predetermined drive current. As a result, the image qualities may be made substantially equal to each other. Alternatively, the frequency of the high frequency signal may be selected to be such a frequency present within a preselected range containing the integer multiplication, for example, may be selected to be a frequency range defined by ±25%, preferably ±10%. As a result, it is possible to avoid a conspicuous lowering of the image quality.

It should also be understood that the above-described inventive idea may become especially advantage in the case that the above-explained photosensitive material is a halide silver photosensitive material, namely, this photosensitive material corresponds to a high-grade photosensitive material having a very high sensitivity, which may be used up to a low exposure range.

An image exposing method, according to a third aspect of the invention, comprises the steps of: emitting an optical beam which contains laser light and emitted light other than the laser light; focusing the optical beam on a photosensitive material; scanning and exposing the photosensitive material with an optical beam which has been modulated in response to image data to be recorded; inputting a type of the photosensitive material; setting a sensitive level at which the photosensitive material is sensitized and a non-sensitive level at which the photosensitive material is not sensitized in accordance with the type of the photosensitive material; and driving the optical beam such that a light amount of an optical beam irradiated to the photosensitive material becomes one of at least equal to the sensitive level and no more than equal to the non-sensitive level in accordance with the image data.

An image exposing method, according to a fourth aspect of the present invention, comprises the steps of: emitting an optical beam which includes laser light and emitted light other than the laser light with a GaN-based semiconductor laser; focusing the optical beam on a photosensitive material; scanning and exposing the photosensitive material with an optical beam in accordance with image data to be recorded; supplying a drive current to the GaN-based semiconductor laser for each pixel data of image data, which drive current includes a first drive current that is higher than a predetermined drive current, and a second drive current that is lower than the predetermined drive current at least once within a supply time period during which the predetermined drive current should be supplied to the GaN-based semiconductor laser.

As previously described, an effect of the invention is achieved in that both the sensitive level and the non-sensitive level are properly set in accordance with the type of photosensitive material, and thus, the deterioration of the image quality caused by the stray light can be suppressed.

Another effect of the invention is achieved in that the deterioration in the sharpness of the image, which is caused by the stray light, can be suppressed.

BRIEF DESCRIPTION OF THE DRAWINGS

For a better understanding of the present invention, reference is made of a detailed description to be read in conjunction with the accompanying drawings, in which:

FIG. 5 is a schematic diagram showing an arrangement of an optical system of a laser light source;

FIG. 9 is a schematic diagram showing such a case that a GaN-based semiconductor laser is employed in the light source of the silver salt type exposing apparatus for performing the spot scanning operation by using the polygon and the like;

DESCRIPTION OF THE PREFERRED EMBODIMENTS

Referring now to drawings, one example of a first embodiment of the present invention will be described in detail. This first embodiment corresponds to such an embodiment in which the invention is applied to a digital photo-lab system.

(Brief Description of Entire System)

Figure 1:
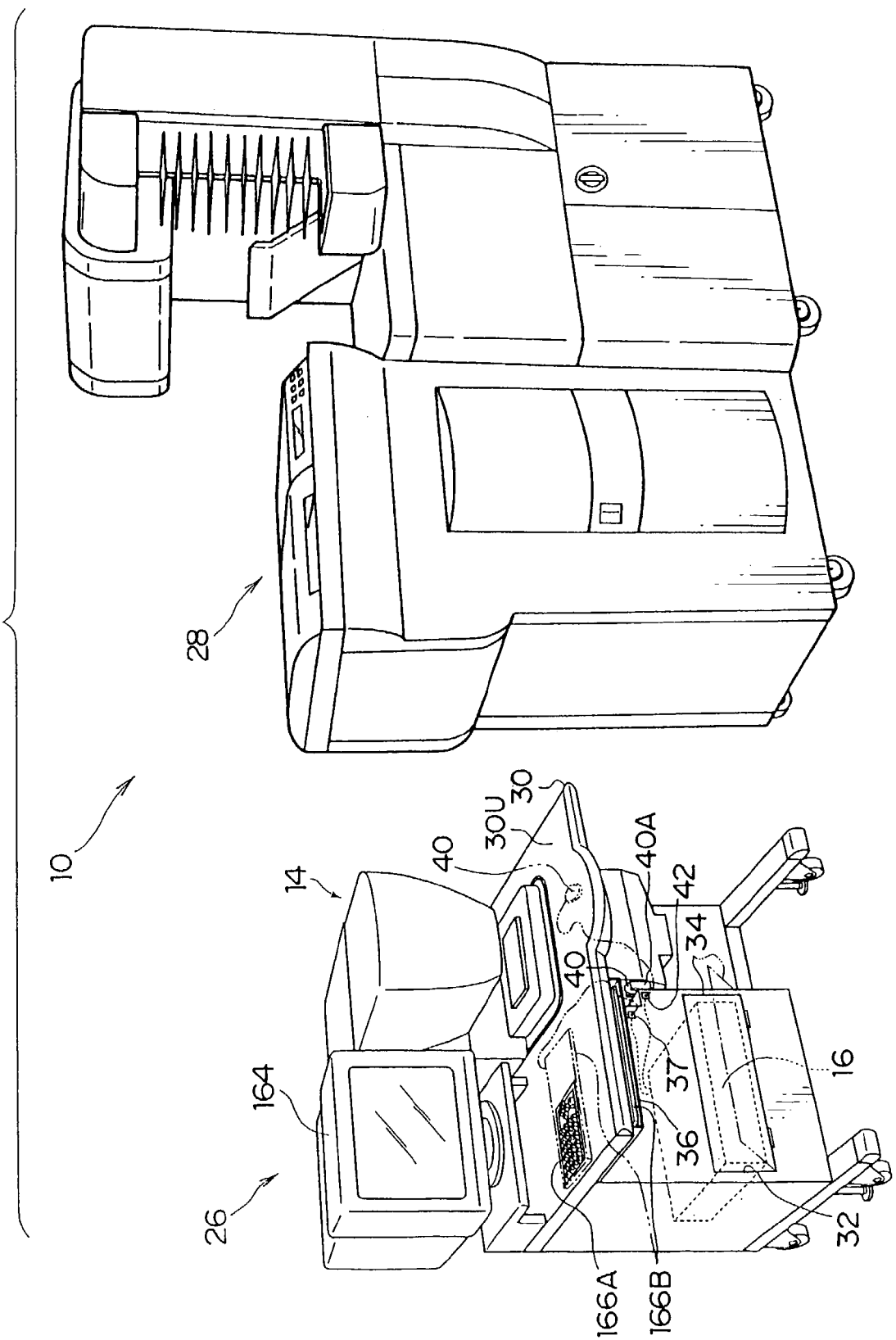
FIG. 1 is a perspective view showing an outer view of a digital photo-lab system according to an embodiment of the invention.
Figure 2:
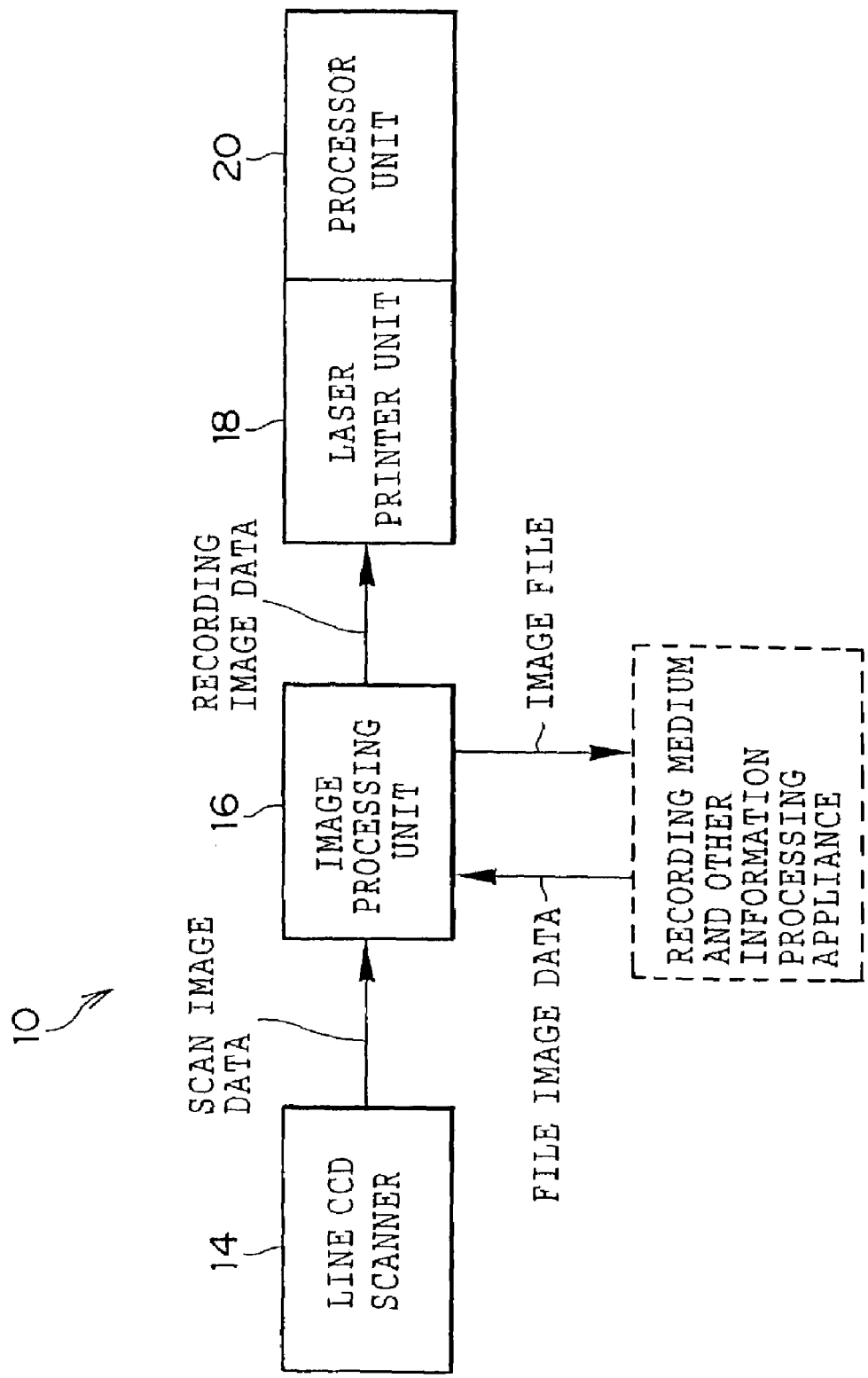
FIG. 2 is a block diagram schematically showing an arrangement of the digital photo-lab system according to the embodiment of the invention.

FIG. 1 shows an outer view of a digital photo-lab system 10. FIG. 2 is a block diagram for schematically indicating an arrangement of the digital photo-lab system 10. As indicated in FIG. 2, this digital photo-lab system 10 is arranged by containing a line CCD scanner 14, an image processing unit 16, a laser printer unit 18 functioning as an image exposing apparatus, and a processor unit 20. Both the line CCD scanner 14 and the image processing unit 16 are arranged in an integral form as an input unit 26 shown in FIG. 1, whereas both the laser printer unit 18 and the processor unit 20 are arranged in an integral form as an output unit 28 indicated in FIG. 2.

The line CCD scanner 14 is employed so as to read film images (either negative images or positive images, which are visible by photographing photographic objects and thereafter by developing photographed objects). These film images have been recorded on photographic photosensitive materials (will be simply referred to as "photographic films" hereinafter) such as photographic films (for example, negative films and reversal films). This line CCD scanner 14 may read as reading objects, for instance, film images of photographic films having 135 sizes; film images of photographic films having 110 sizes; film images of photographic films on which transparent magnetic layers are formed (photographic films having 240 sizes, namely so-called "APS films"); and film images of photographic films having 120 sizes and 220 sizes (brownie size). The line CCD scanner 14 reads out film images of the above-described reading subject by using a 3-line color CCD to output R, G, B color image data.

As indicated in FIG. 1, the line CCD scanner 14 is mounted on a work table 30. The image processing unit 16 is stored into a storage unit 32 which is formed on the lower side of the work table 30, and a door 34 is mounted on an opening portion of the storage unit 32. Normally, the storage unit 32 is brought into such a condition that an inside portion of this storage unit 32 is shielded by the door 34. When the door 34 is pivotally moved, the inside portion is exposed, so that the storage unit 32 is brought into such a condition that the image processing unit 16 may be taken out.

Also, a display 164 is mounted on a depth side on the work table 30, and also two types of keyboards 166A and 166B are provided in a parallel manner. One type of keyboard 166A is embedded in the work table 30. The other type of keyboard 166B is stored into a drawer 36 of the work table 30 when this keyboard 166B is not used, and is taken out from drawer 36 when this keyboard 166B is used, and then is arranged in such a manner that this keyboard 166B is put on top of the keyboard 166A. When the keyboard 166B is used, a connector (not shown) which is mounted on a tip portion of an electric cord (signal line) extended from the keyboard 166B is connected to a jack 37 provided on the work table 30, so that the keyboard 166B is electrically connected via the jack 37 to the image processing unit 16.

A mouse 40 is arranged on a work plane 30U of the work table 30. A cord (signal line) of the mouse 40 is extended via a hole 42 formed in the work table 30 into the storage unit 32, and is connected to the image processing unit 16. The mouse 40 is stored in a mouse holder 40A when this mouse 40 is not used. When the mouse 40 is used, the mouse 40 is taken out from the mouse holder 40A, and is then arranged on the work plane 30U.

The image processing unit 16 is arranged in such a manner that image data (scan image data) outputted from the line CCD scanner 14 may be entered, and also, image data acquired by executing photographing operation of a digital camera, image data obtained by reading an original (for example, reflected original) other than a film image by using a scanner, and further, image data produced by a computer may be inputted from an external source. All of the above-described image data except for the scan image data taken out from the line CCD scanner 14 will be totally referred to as "file image data" hereinafter. This file image data may be entered via a storage medium such as a memory card, or may be entered via a communication line from other information processing appliances.

The image processing unit 16 performs image processing operations, for example, various types of correcting operations, with respect to entered image data, and then, enters the image-processed image data as recording image data into the laser printer unit 18. Also, the image processing unit 16 may output such image data which has been image-processed as an image file (for instance, image processing unit 16 may output image data to information storage medium such as a memory card, or may output image data via a communication line to other image processing appliances).

The laser printer unit 18 is provided with R, G, and B laser light sources. The laser printer unit 18 irradiates laser light onto photographic paper (printing paper), while this laser light is modulated in response to recording image data which is entered from the image processing unit 16. Then, the laser printer unit 18 scans and exposes this laser light so as to record an image (latent image) on the photographic paper. Also, the processor unit 20 performs various types of processing operations such as color development, bleaching/fixing process, washing process, and drying process with respect to the photographic paper on which the image has been recorded by performing the scanning and exposing operation with the laser printer unit 18. Thus, the image is formed on the photographic paper.

(Detailed Construction of Laser Printer Unit)

Figure 3:
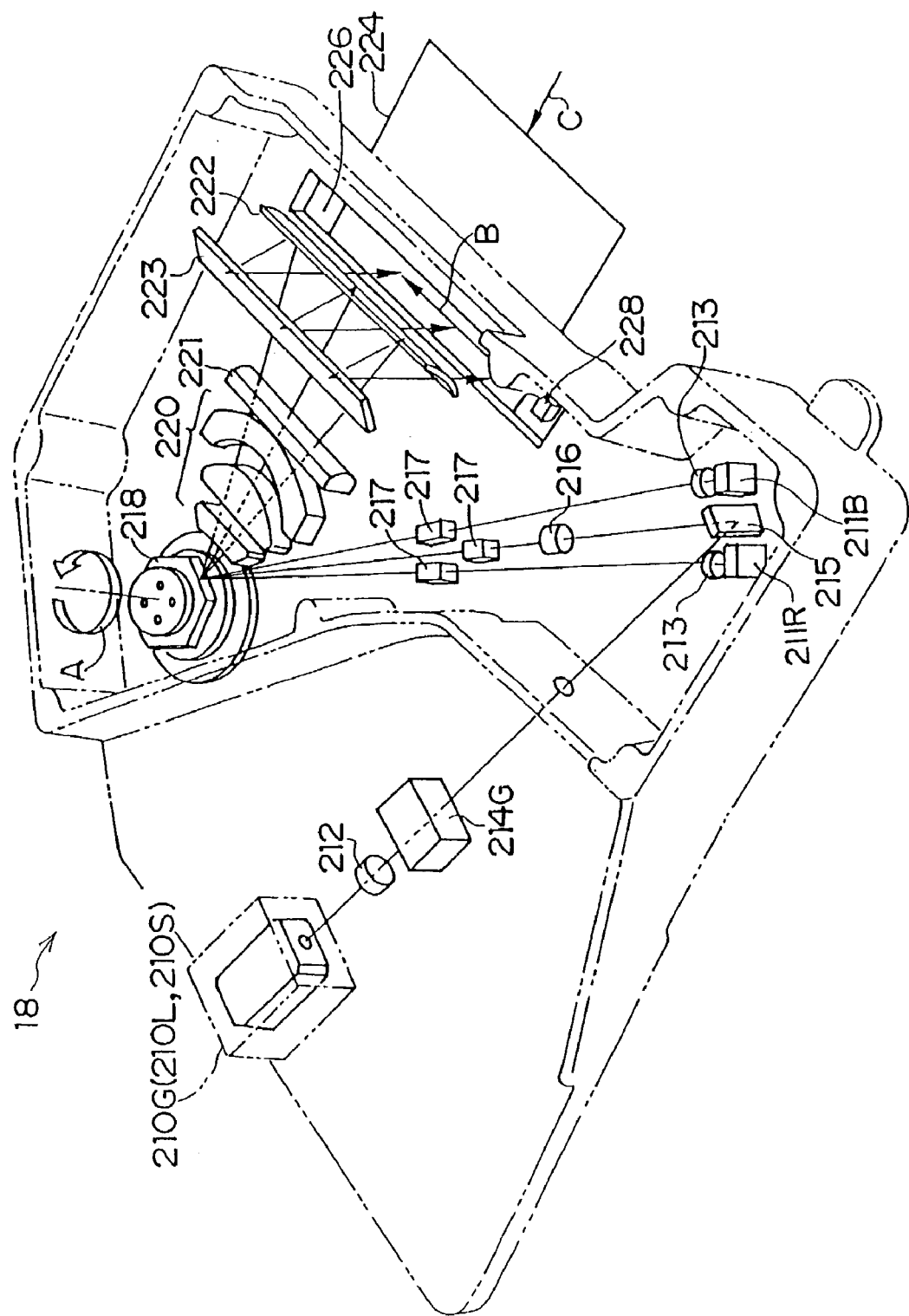
FIG. 3 is a perspective view schematically showing a construction of a laser printer unit.

Next, a construction of the laser printer unit 18 will now be explained in detail. FIG. 3 shows a construction of an optical system of the laser printer unit 18.

The laser printer unit 18 is equipped with three sets of laser light sources, namely, laser light sources 211R, 210G, and 210B. The laser light source 211R is constructed of a semiconductor laser (LD) which emits laser light (referred to as "R-laser light" hereinafter) having an R (red)-wavelength (for example, 685 nm). Also, the laser light source 210G is constituted by an LD 210L functioning as a laser light emitting component, and a wavelength converting element (SHG) 210S functioning as a wavelength converting component which may convert laser light emitted from this LD 210L into laser light having a ½ wavelength with respect to the wavelength of the first-mentioned laser light. An oscillation wavelength of the laser light emitting component LD 210L is determined in such a manner that laser light (referred to as "G-laser light" hereinafter) having a G (green)-wavelength (for example, 532 nm) is emitted from the wavelength converting element SHG 210G. The laser light source 211B is constructed of a semiconductor laser LD which emits laser light (referred to as "B-laser light" hereinafter) having a B-(blue) wavelength (for instance, 440 nm).

A collimator lens 212 and an acoustic-optic element (AOM) 214G functioning as an external modulating component are sequentially arranged on the laser light emission side of the laser light source 210G. The AOM 214G is arranged in such a manner that incident laser light may transmit an acoustic-optic medium, and is connected to an AOM driver (not shown). When a high frequency signal is entered from the AOM driver into this AOM 214G, ultrasonic waves are propagated through the acoustic-optic medium in response to the high frequency signal, and an acoustic-optic effect may be effected to laser light which transmits the acoustic-optic medium, so that diffraction occurs. Thus, a laser light having intensity in correspondence with an amplitude of the high frequency signal is emitted from the AOM 214G as diffraction light.

A plane mirror 215 is arranged on the diffraction light emission side of the AOM 214G. A spherical lens 216, a cylindrical lens 217, and a polygon mirror 218 are sequentially arranged on the laser light emission side of this plane mirror 215. The G-laser light which is emitted from the AOM 214G as the diffraction light is reflected by the plane mirror 215, and thereafter, this reflected G-laser light is reflected via both the spherical lens 216 and the cylindrical lens 217 on a predetermined position on a reflection plane of the polygon mirror 218, and then, is reflected by the polygon mirror 218.

On the other hand, a collimator lens 213 and a cylindrical lens 217 are sequentially arranged on the laser light emission sides of both the laser light source 211R and the laser light source 210B. The laser light emitted from the laser light sources 211R and 211B is collimated to produce collimated laser light by the collimator lens 213, and then, the collimated laser light is irradiated at a position substantially equal to the above-described predetermined position on the reflection plane of the polygon mirror 218 via the cylindrical lens 217, and then is reflected on the polygon mirror 218.

Three pieces of R, G, B laser light which are reflected on the polygon mirror 218 sequentially transmit an fθ lens 220 and a cylindrical lens 221, and then are reflected by a cylindrical mirror 222, and thereafter, are reflected by a folding mirror 223 along a substantially vertical direction. These three pieces of reflected laser light are irradiated via an opening portion 226 onto photographic paper 224. It should be noted that while the folding mirror 223 is omitted, these three pieces of reflected laser light may be directly reflected by the cylindrical mirror 222 along the substantially vertical direction to be irradiated onto the photographic paper 224.

On the other hand, a scanning start detection sensor (referred to as an "SOS detection sensor" hereinafter) 228 is arranged in the vicinity of a side of a scanning and exposing start position on the photographic paper 224, and this SOS detection sensor 228 detects the R-laser light which has been reached via the opening portion 226. The reason why such laser light detected by the SOS detection sensor 228 is defined as the R-laser light is given as follows: That is, since photographic paper owns the lowest sensitivity as to R-laser light and thus a light amount of this R-laser light is set to the largest light amount, this R-laser light can be firmly detected, and also, the R-laser light can be reached to the SOS detection sensor 228 at the fastest time during laser scanning operations by rotating the polygon mirror 218. Also, in this first embodiment, a level of a signal (referred to as a "sensor output signal" hereinafter) which is outputted from the SOS detection sensor 228 is normally set to a low level, and is set to a high level only when the R-laser light is detected.

Although not shown in FIG. 3, the laser printer unit 18 is provided with both a pinhole 102 and a monitor optical system 104 (see FIG. 5) at a position where the B-laser light is converged. The pinhole 102 is employed so as to eliminate stray light (emitted light) corresponding to the LED emission light component. The monitor optical system 104 is used to monitor the B-laser light (will be discussed later more in detail).

Figure 4:
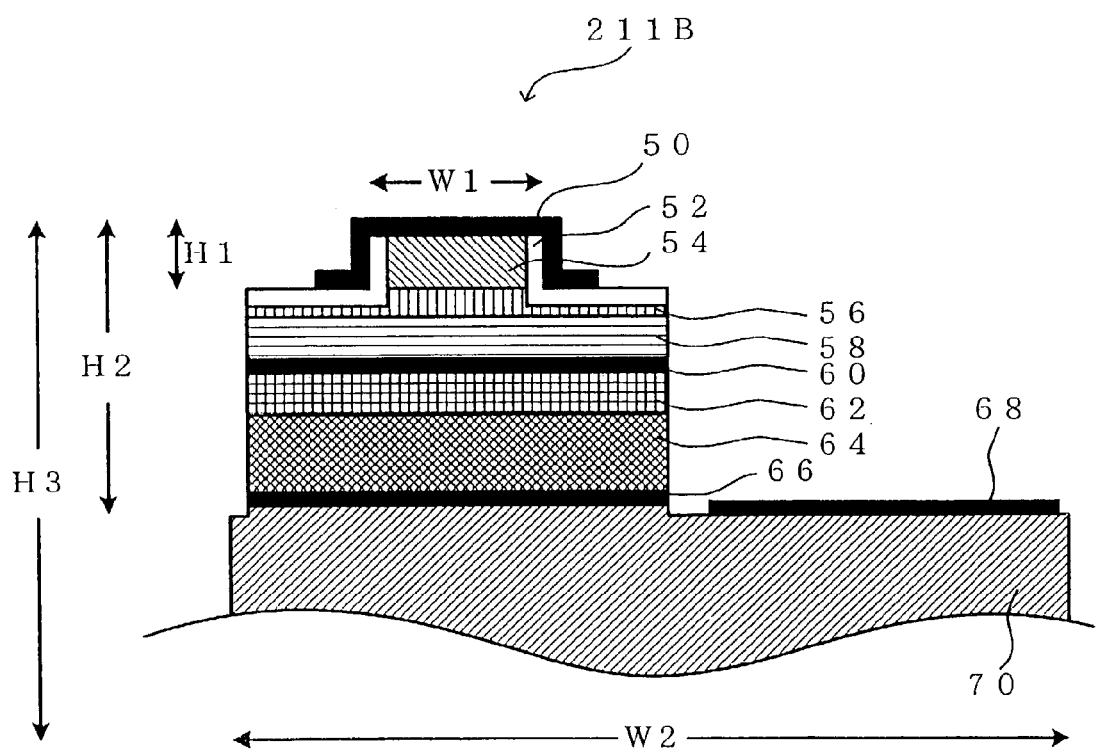
FIG. 4 is a schematic sectional view showing a detailed structure of a GaN-based semiconductor laser.

Next, a description will now be made of a detailed construction of the laser light source 211B according to this first embodiment. FIG. 4 represents a schematic sectional view of the laser light source 211B according to this first embodiment of the invention. It should be noted that in FIG. 4, W1=1.7 μm, W2=300 μm, H1=approximately 0.9 μm, H2=approximately 3.5 μm, and H3=100 μm.

The laser light source 211B is constituted by an InGaN semiconductor laser, and, as shown in FIG. 4, a low defect GaN substrate layer is formed on a sapphire c-plane substrate (by manufacturing method described in S. Nagahama et. al., Jpn. Appl. Phys. Vol. 39, No. 7A, p. L347 (2000)).

Next, while the normal pressure MOCVD method is employed, an n-GaN buffer layer (Si is doped by 5 μm) 70 is grown; an n-In0.1Ga0.9N buffer layer (Si is doped by 0.1 μm) 66 is grown; an n-Al0.1Ga0.9N cladding layer (Si is doped by 0.45 μm) 64 is grown; an n-GaN optical guide layer (Si is doped by 0.04 to 0.08 μm) 62 is grown; an undoped activate layer 60 is grown; a p-GaN optical guide layer (Mg is doped by 0.04 to 0.08 μm) 58 is grown; a p-Al0.1Ga0.9N cladding layer (Mg is doped by 0.45 μm) 56 is grown; and also, a p-GaN cap layer (Mg is doped by 0.25 μm) 54 is grown.

An activated layer 60 is formed by such a dual quantum well structure of: undoped In0.05Ga0.95N (10 nm), an undoped In0.23Ga0.77N quantum well layer (3 nm), undoped In0.05Ga0.95N (5 nm), an undoped In0.23Ga0.77N quantum well layer (3 nm), undoped In0.05Ga0.9N (10 nm), and also undoped Al0.1Ga0.9N (10 nm).

Next, a ridge stripe having a width of approximately 1.7 μm is formed by employing both photolithography and etching process operations in such a manner that this ridge stripe is edged over a distance of 0.1 μm from a p-GaN optical guide layer 58 within a p-Al0.1Ga0.9N cladding layer 56 by way of an RIBE (reactive ion beam etching) process operation with employment of chlorine ions.

Next, after an SiN film 52 has been formed over the entire surface by way of the plasma CVD method, an necessary portion formed on the ridge is removed by both the photolithography and etching process operations. Thereafter, p-type impurities are activated by the thermal treatment within a nitrogen gas atmosphere. Then, an epitaxial layer other than a portion containing a light emission region is removed by way of the RIBE (reactive ion beam etching) process operation with employment of chlorine ions until an n-GaN buffer layer 70 is exposed. Thereafter, as an n-electrode 68, Ti/Al/Ti/Au is vapor-deposited and annealed within nitrogen, and also as a p-electrode 50, Ni/Au is vapor-deposited and annealed within nitrogen, so that ohmic electrodes are formed. An edge plane of a resonator is formed by way of the cleavage treatment.

In this first embodiment, an oscillation wavelength is 440 nm, and a half total angle of a beam radiation angle along the vertical direction at a junction is 34 degrees. It should also be noted that even when a sapphire substrate functioning as an insulating material is employed, the above-described structure of the laser light source 211B may be fabricated. Alternatively, a similar semiconductor laser structure may be formed on a conductive substrate such as SiC. Furthermore, a dislocation of an oscillating stripe region may be reduced by employing the ELOG (epitaxially lateral over growth) technology (see Matsushita "OPTRONICS" No. 1, page 62 in 2000).

Subsequently, an optical system of the laser light source (above-described GaN-based semiconductor laser) 211B according to this first embodiment will now be described. FIG. 5 is a schematic diagram illustratively showing the optical system of the laser light source 211B.

As shown in FIG. 5, a pinhole 102 is provided between the cylindrical lens 217 and the polygon mirror 218, while the pinhole 102 is formed by forming a hole in a predetermined plate-shaped member. As a result, light of LED emission components, namely stray light 198, may be removed, so that an image having a higher sharpness may be obtained.

Also, a half mirror 106 is provided between the collimator lens 213 and the cylindrical lens 217, and a monitor optical system 104 is provided on the light reflection side of the half mirror 106. It should be understood that both the half mirror 106 and the monitor optical system 104 correspond to the monitor optical system of the invention.

A light amount of an optical beam, which passes through the monitor optical system 104, is detected by a light receiving element 108. A B-driving LD drive circuit 100 drives the laser light source 211B in such a manner that the light amount detected by the light receiving element 108 becomes a predetermined light amount. The monitor optical system 104 is arranged in such a way that such an optical beam is monitored which is substantially equal to an optical beam reached to the photographic paper 224. This monitor optical system 104 is constituted by both a cylindrical lens 110 and another pinhole 112. As a result, such light from which the stray light 198 has been removed by the pinhole 112 may be detected by the light receiving element 108, so that detection errors can be suppressed. It should also be noted that the setting position of the pinhole 102 is not limited only to the above-described position, but also may be defined at any positions where the optical beam is converged.

Figure 6:
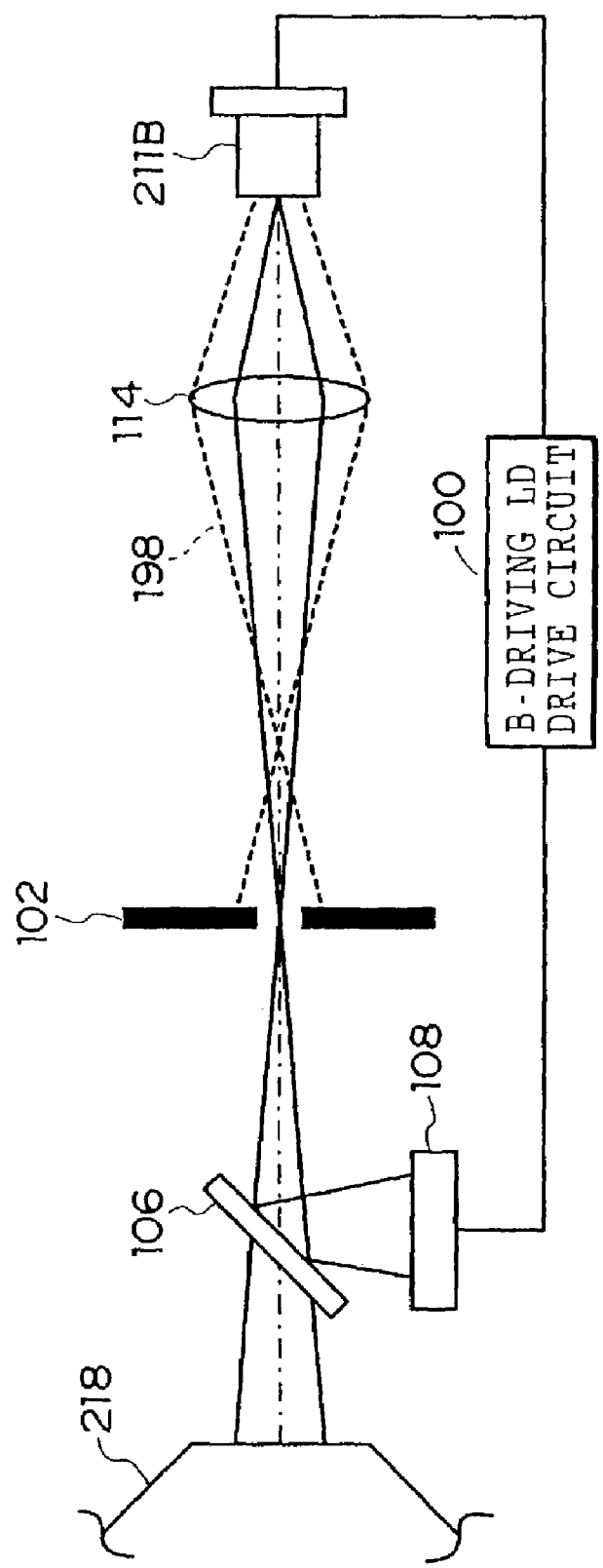
FIG. 6 is a schematic diagram showing an arrangement of another optical system of a laser light source.

Also, as represented in FIG. 6, while the half mirror 106 may be provided between the polygon mirror 218 and the pinhole 102 which is provided at a rear position of a light collecting optical system 114 containing both the collimator lens 213 and the cylindrical lens 217, light reflected by the half mirror 106 may be detected by the light receiving element 108.

(Arrangement of Control Unit)

Next, a control unit of the laser printer unit 18 containing a drive circuit for driving the laser light source 211B constructed of the GaN-based semiconductor laser will now be explained in detail.

Figure 7:
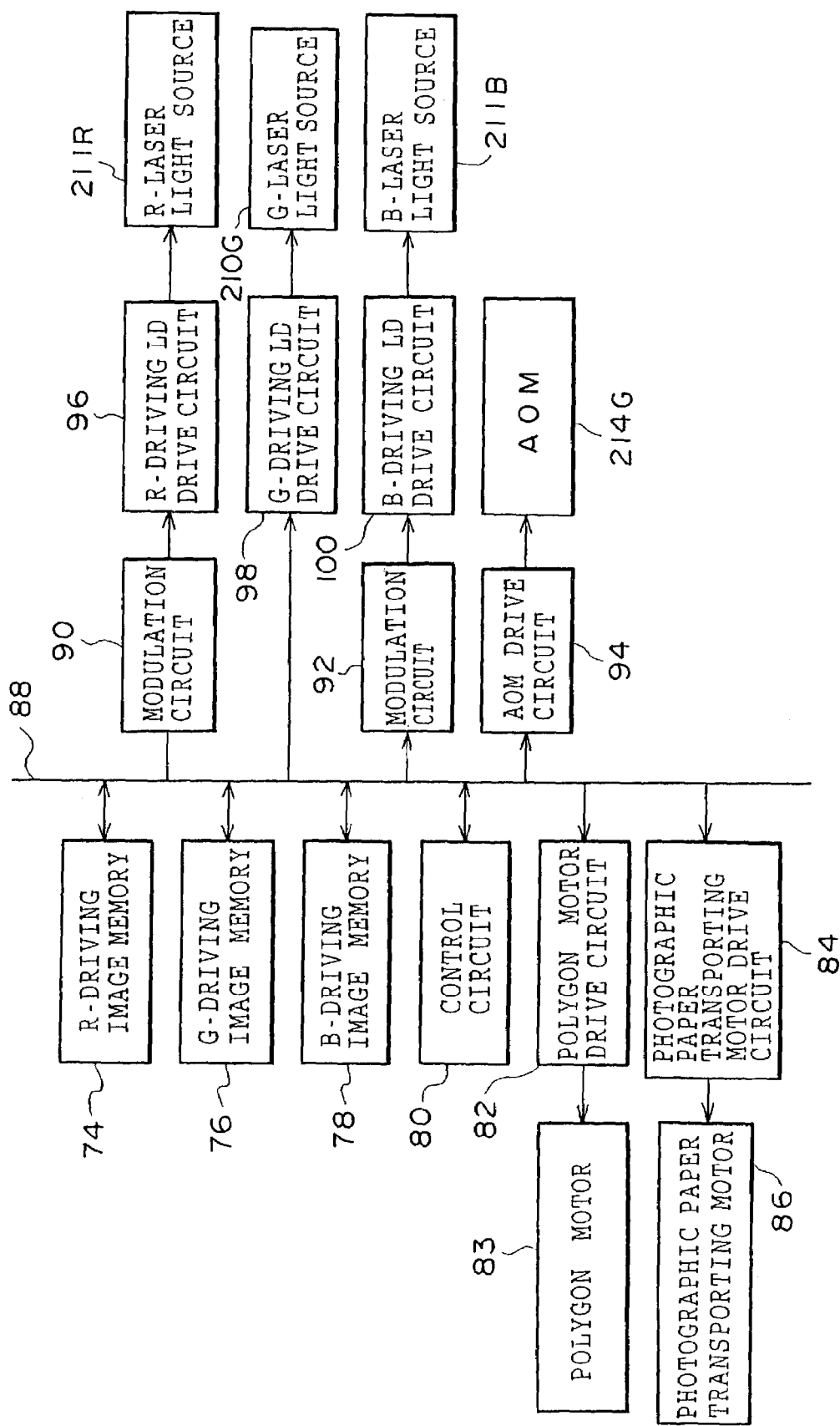
FIG. 7 is a schematic block diagram showing a control unit of the laser printer unit.

As shown in FIG. 7, the control unit according to this first embodiment is equipped with a control circuit 80 containing a microcomputer. The control unit 80 is connected to a bus 88, while image data memories 74, 76, and 78 are connected to this bus 88. In other words, the image data memories 74, 76, and 78 are provided as a memory which stores thereinto image data in order to record images on the photographic paper 224. The image data memory 74 corresponds to a memory for storing image data of an R(red) color. Similarly, the image data memory 76 corresponds to a memory for storing image data of a G(green) color, and the image data memory 78 corresponds to a memory for storing image data of a B(blue) color.

Also, an R-driving LD drives circuit 96, a G-driving LD drive circuit 98, and a B-driving LD drive circuit 100 are connected to the bus 88. Both the R-driving LD drive circuit 96 and the B-driving LD drive circuit 100 are connected via a modulation circuit 90 and another modulation circuit 92 to the bus 88, respectively. In other words, the semiconductor lasers 211R and 211B are modulated in a intensity binary modulating method, since modulation signals (for instance, pulse-width-modulation (PWM) signals) are produced by the modulation circuits 90 and 92 based upon image data, and then, these modulation signals are superimposed with each other by the LD drive circuits.

Also, an AOM drive circuit 94 is connected to the bus 88, so that driving of the AOM 94 is controlled. In other words, the laser light source 210G may be indirectly modulated by the AOM 214G.

Furthermore, a polygon motor drive circuit 82 and a photographic paper transporting motor drive circuit 84 are connected to this bus 88. The polygon motor drive circuit 82 is to drive a polygon motor 83 which rotary-drives the polygon mirror 218. The photographic paper transporting motor drive circuit 84 drives a photographic paper transporting motor 86, which transports the photographic paper 224. The polygon motor drive circuit 82 and the photographic paper transporting motor drive circuit 84 are controlled by the control circuit 80, respectively.

Figure 8:
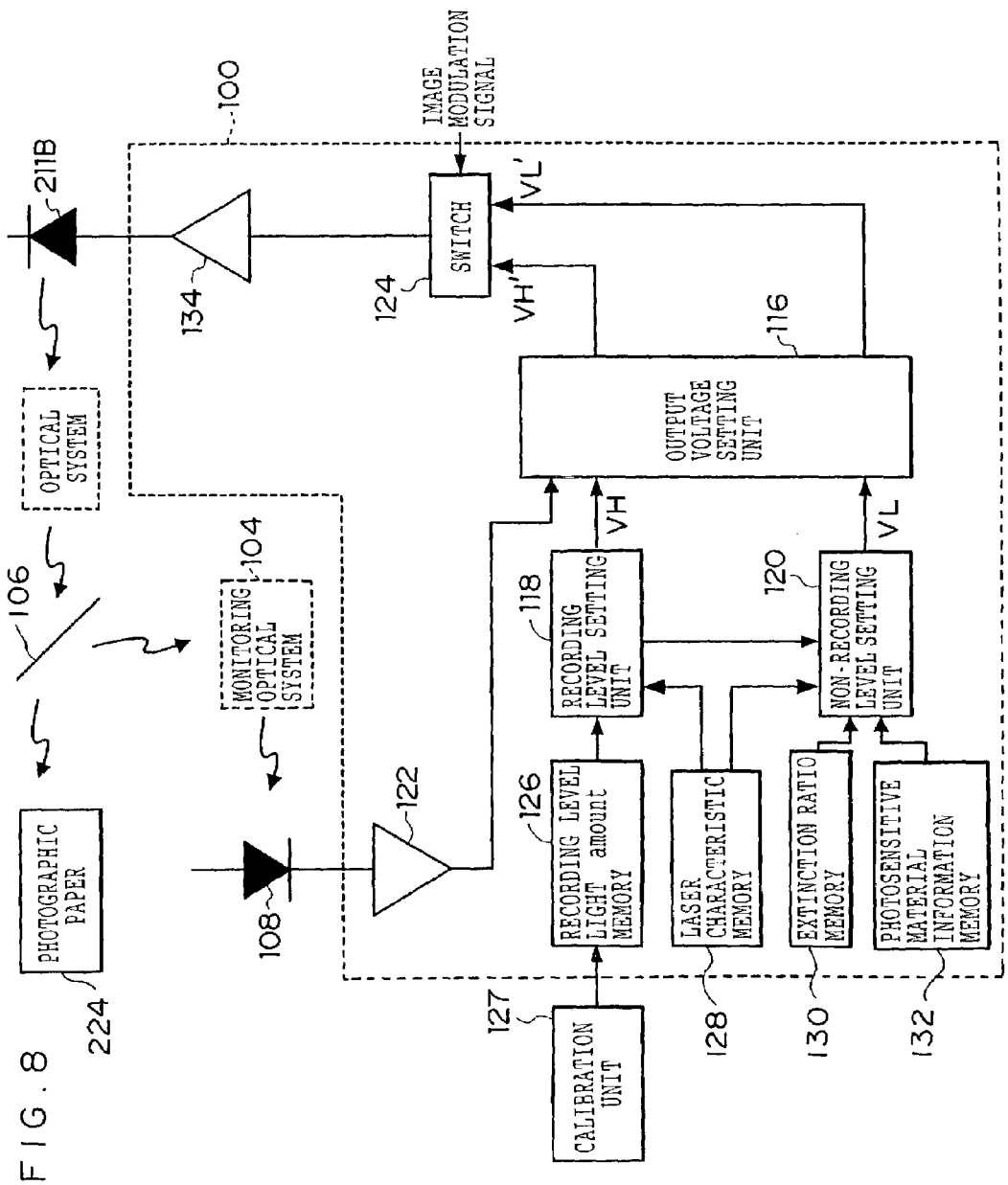
FIG. 8 is a diagram schematically showing an arrangement of an LD drive circuit.
Figure 9:
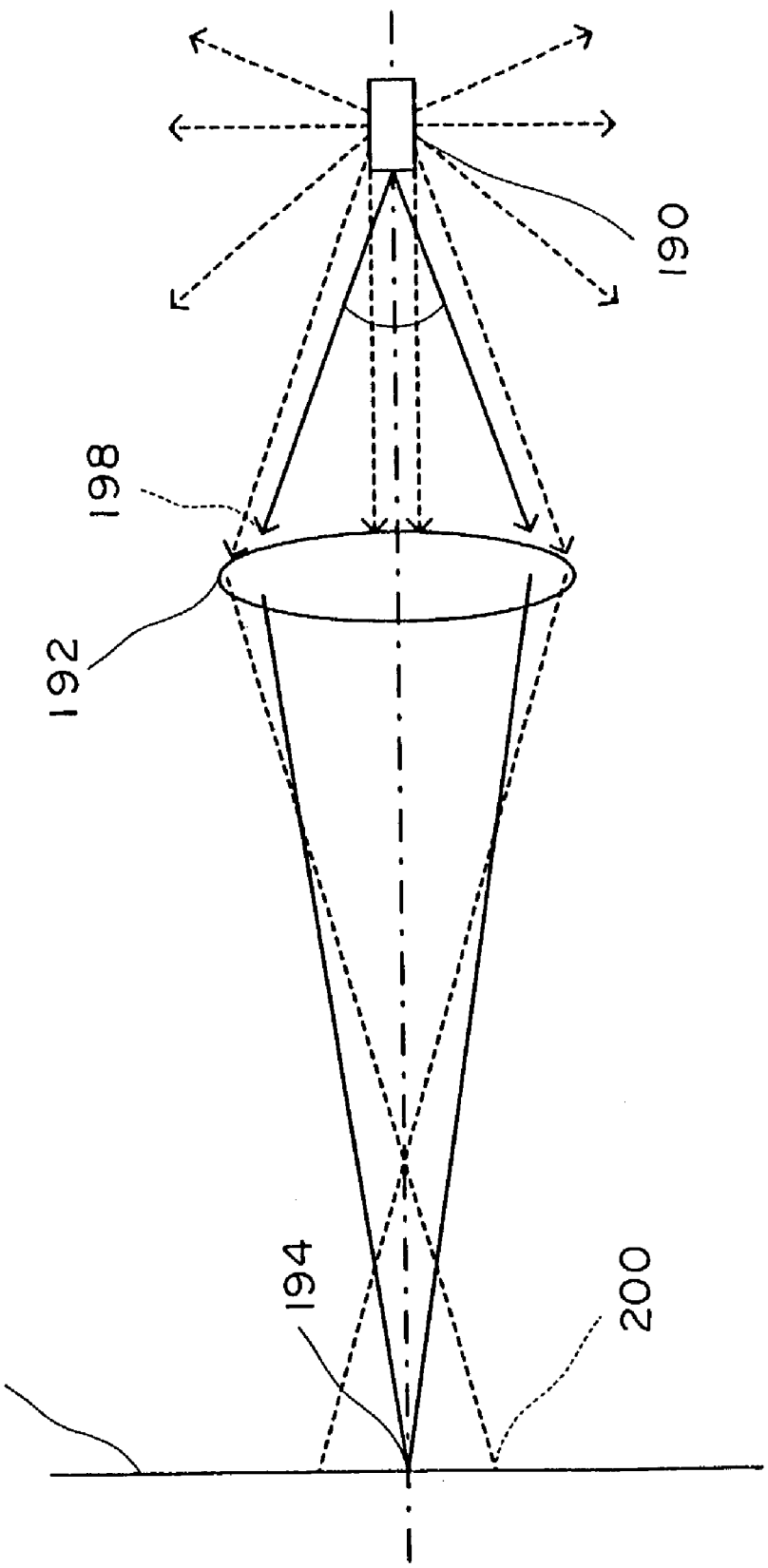

Next, the B-driving LD drive circuit 100 will now be explained. As shown in FIG. 8, the B-driving LD drives circuit 100 is provided with an output voltage setting unit 116. To this output voltage setting unit 116, a recording level setting unit 118, a non-recording level setting unit 120, a current/voltage converting circuit 122, and a switch 124 are connected.

Both a recording level light amount memory 126 and a laser characteristic memory 128 are connected to the recording level setting unit 118. While a calibration unit 127 is connected to the recording level light amount memory 126, an optimum light amount level (measured sensitive level) which had been set by calibration previously carried out by the calibration unit 127 has previously been stored in the recording level light amount memory 126. In other words, a light amount level at which the photographic paper 224 may be photosensitively sensitized has been previously stored in this recording level light amount memory 126.

The calibration unit 127 is arranged by containing, for example, a calorimeter and the like. For instance, while a predetermined test pattern is recorded on the photographic paper 224, this recorded test pattern is colorimetry-measured by using the calorimeter, and an optimum light amount level is set in order that the recorded test pattern may be sensitized at a predetermined level. Since this colorimetry and optimum level setting operation is arbitrarily carried out in a predetermined interval, images having better image qualities can be obtained irrespective of fluctuations contained in the photographic paper 224 and also irrespective of the degradation over time of the apparatus.

A laser characteristic of the laser light source 211B, namely, a correspondence relationship between a drive voltage (or drive current) of a laser and an optical output of this laser has been previously stored in a laser characteristic memory 128. Alternatively, while a drive voltage of a laser is changed, an optical output of the laser may be measured so as to acquire a laser characteristic, and then, this acquired laser characteristic may be stored in the laser characteristic memory 128. Since this operation is arbitrarily carried out in a predetermined interval, an error, which is caused by the degradation over time of the apparatus, can be suppressed.

The recording level setting unit 118 acquires a drive voltage corresponding to the light amount level stored in the recording level light amount memory 126 from the laser characteristic stored in the laser characteristic memory 128, and sets this acquired drive voltage as a recording level (voltage) "VH", and then, outputs this recording level VH to the output voltage setting unit 116.

On the other hand, both an extinction ratio memory 130 and a photosensitive material information memory 132 are connected to the non-recording level setting unit 120.

An extinction ratio has been previously stored in the extinction ratio memory 130. The extinction ratio is a ratio "α" (=B/A) of a sensitive level "A" (first reference sensitive level) for sensitizing a photosensitive material (photographic paper) at a predetermined level to a non-sensitive level "B" (second reference sensitive level) for not sensitizing the photosensitive material. As this extinction ratio "α", such an extinction ratio obtained from an experiment and the like may be employed. This extinction ratio "α" may be set in such a manner that a difference between the sensitive level and the non-sensitive level becomes minimum. Also, since extinction ratios "α" are different from each other, depending upon types of photosensitive materials, these extinction ratios are stored in the extinction ration memory 130 every types of photosensitive materials.

Information as to photosensitive materials, namely, such information used to specify the type of photographic paper 224 has been stored in the photosensitive material information memory 132.

In the non-recording level setting unit 120, such an extinction ratio is read out from the extinction ratio memory 130, while this extinction ratio corresponds to a type of a photosensitive material stored in the photosensitive material information memory 132, and then, a non-recording level "VL" is calculated based upon the read extinction ratio and the recording level VH recorded by the recording level setting unit 118, and thereafter, this calculated non-recording level "VL" is outputted to the output voltage setting unit 116. It should also be noted that the non-recording level VL may be obtained by calculating α×VH.

Also, the current-to-voltage converting circuit 122 connected to the light receiving element 108 is connected to the output voltage setting unit 116. The light receiving element 108 outputs an optical current in response to a light amount of a detected optical beam to the current-to-voltage converting circuit 122. This current-to-voltage converting circuit 122 converts the optical current taken out from the light receiving element 108 into a voltage, and then outputs the converted voltage to the output voltage setting unit 116. The output voltage setting unit 116 sets either an output voltage VH' or another output voltage VL' in such a manner that the detected voltage becomes either the recording level VH or the non-recording level VL set by the recording level setting unit 118. Then, the output voltage setting unit 116 outputs this set output voltage to the switch 124.

The switch 124 is switching-operated in such a way that either the output voltage VH' or the output voltage VL' is outputted to the drive circuit 134 for driving the laser light source 211B in response to an image modulation signal (for example, pulse-width-modulation signal) outputted from the modulation circuit 92. As a result, such a control operation is carried out in such a manner that the detected voltage becomes VH, or VL.

As previously described, since the non-recording level is set based upon both the optimum recording level determined byway of the calibration and the like, and also, the extinction ratio determined every type of the photosensitive material, both the recording level and the non-recording level may be set under optimum conditions irrespective of the types of these photosensitive materials. Also, since the extinction ratio "α" is set in such a manner that the difference between the sensitive level and the non-sensitive level may become minimum, the switching operation between the recording level and the non-recording level can be carried out in a high speed in the drive circuit 134.

Next, operations of the laser printer unit 18 according to this embodiment will now be explained.

In the case that an image is recorded on the photographic paper 224, the control unit of the laser printer unit 18 executes various types of corrections with respect to recording-purpose image data based upon an image-recording parameter entered from the image processing unit 16, and thus produces scanning and exposing-purpose image data, and thereafter stores the scanning and exposing-purpose image data into the image data memories 74, 76, and 78 in order that such an image indicated by the recording-purpose image data entered from the image processing unit 16 is recorded on the photographic paper 224 by scanning and exposing operations.

Then, the control unit of the laser printer unit 18 rotates the polygon mirror 218 of the laser printer unit 18 along an arrow "A" direction shown in FIG. 3, and supplies drive currents with respect to the semiconductor lasers of the laser light sources 211R, 210G, 211B so as to emit laser beams therefrom. Also, the control unit produces a modulation signal based upon the produced scanning and exposing-purpose image data, and changes an amplitude of an ultrasonic signal (high frequency signal) supplied to the AOM 214G in response to a signal level of the modulation signal so as to modulate a laser beam which is emitted from the AOM 214G as diffraction light. As a consequence, such a laser beam, which has been intensity-modulated in response to density of an image to be recorded on the photographic paper 224, is emitted from the AOM 214G. This laser beam is irradiated onto the photographic paper 224 via the plane mirror 215, the spherical lens 216, the cylindrical lens 217, the polygon mirror 218, the fθ lens 220, the cylindrical lens 221, the cylindrical mirror 222, and the folding mirror 223.

Also, with respect to the laser light sources 211R and 211B, laser beams are modulated in accordance with the intensity binary modulation method such as the pulse width modulation. As a consequence, such laser beams, which have been intensity-modulated in response to density of an image to be recorded on the photographic paper 224, are emitted from the laser light sources 211R and 211B. Each of these laser beams is irradiated onto the photographic paper 224 via the collimator lens 213, the cylindrical lens 217, the polygon mirror 218, the fθ lens 220, the cylindrical lens 221, the cylindrical mirror 222, and the folding mirror 223, respectively.

Then, in connection with the rotation of the polygon mirror 218 along an arrow "A" direction shown in FIG. 3, since the irradiation positions of the respective R, G, B laser beams are scanned along another arrow "B" direction shown in FIG. 3, the main scanning operation of these laser beams is carried out, whereas since the photographic paper 224 is transported at a constant speed along another arrow "C" direction shown in FIG. 3, the sub-scanning operations of the respective R, G, B laser beams are carried out, so that an image (latent image) is recorded on the photographic paper 224 by scanning/recording this image.

Also, as described above, as to the recording level used to intensity-binary-modulate the laser beam emitted from the laser light source 211B, the optimum recording level may be set which has been determined by the calibration and the like. The non-recording level may be set based upon the set recording level and the extinction ratio which has been determined every type of the photosensitive material. Thus, the recording level and the non-recording level are set to the optimum independently from the kind of the photosensitive material. Also, since the extinction ratio "α" is set in such a manner that the difference between the sensitive level and the non-sensitive level may become minimum, the switching operation between the recording level and the non-recording level can be carried out in a high speed in the drive circuit 134, so that the load of the drive circuit 134 can be decreased.

It should also be noted that both the timing at which the respective laser beams are modulated and the transport timing of the photographic paper 224 along the arrow "C" direction of FIG. 3 during the above-described scanning and exposing operations are determined based upon a sensor output signal outputted from the SOS detection sensor 228.

The photographic paper 224 on which the image has been recorded by executing the scanning and exposing operation is fed to the processor unit 20, and then this processor unit 20 performs various types of processing operations such as color development, bleaching/fixing process, washing process, and drying process with respect to the photographic paper 224. As a result, the image may be formed on the photographic paper 224.

It should also be understood that the above description has described such a case that the inventive idea of the invention has been applied to the laser light source 211B. The inventive idea of this invention is not limited only to this case, but also may be applied to the laser light sources 211R and 210G.

Next, an example of a second embodiment of the invention will now be described with reference to drawings. It should be noted that the same reference numerals indicated in the first embodiment will be employed as those for denoting the same, or similar structural elements shown in the second embodiment, and explanations thereof are omitted.

In this second embodiment, as indicated in FIG. 7, an R-driving LD drive circuit 96, a G-driving LD drive circuit 98, and a B-driving LD drive circuit 100 are connected to a bus 88. Both the R-driving LD drive circuit 96 and the B-driving LD drive circuit 100 are connected via a modulation circuit 90 and another modulation circuit 92 to the bus 88, respectively. In other words, the semiconductor lasers 211R and 211B are directly modulated in an intensity modulation method, since modulation signals are produced by the modulation circuits 90 and 92 based upon image data, and then, these modulation signals are superimposed with each other by the LD drive circuits.

The B-driving LD drive circuit 100 of this second embodiment will now be explained. As previously explained, since the B-laser light source 211B employs the GaN-based semiconductor laser, larger amounts of stray light are emitted at the same time, as compared with those of other semiconductor lasers, which may give adverse influences to a sharpness of an image recorded on the photographic paper 224. For instance, in such a case that such a laser beam whose optical output is equal to 0.05 mW is emitted, as shown in FIG. 10, a drive current of approximately 26 mW is required to be supplied to the B-laser light source 211B, but light energy of a blurred pattern 200 with respect to light energy of a spot 194 amounts to approximately 50%.

Figure 10:
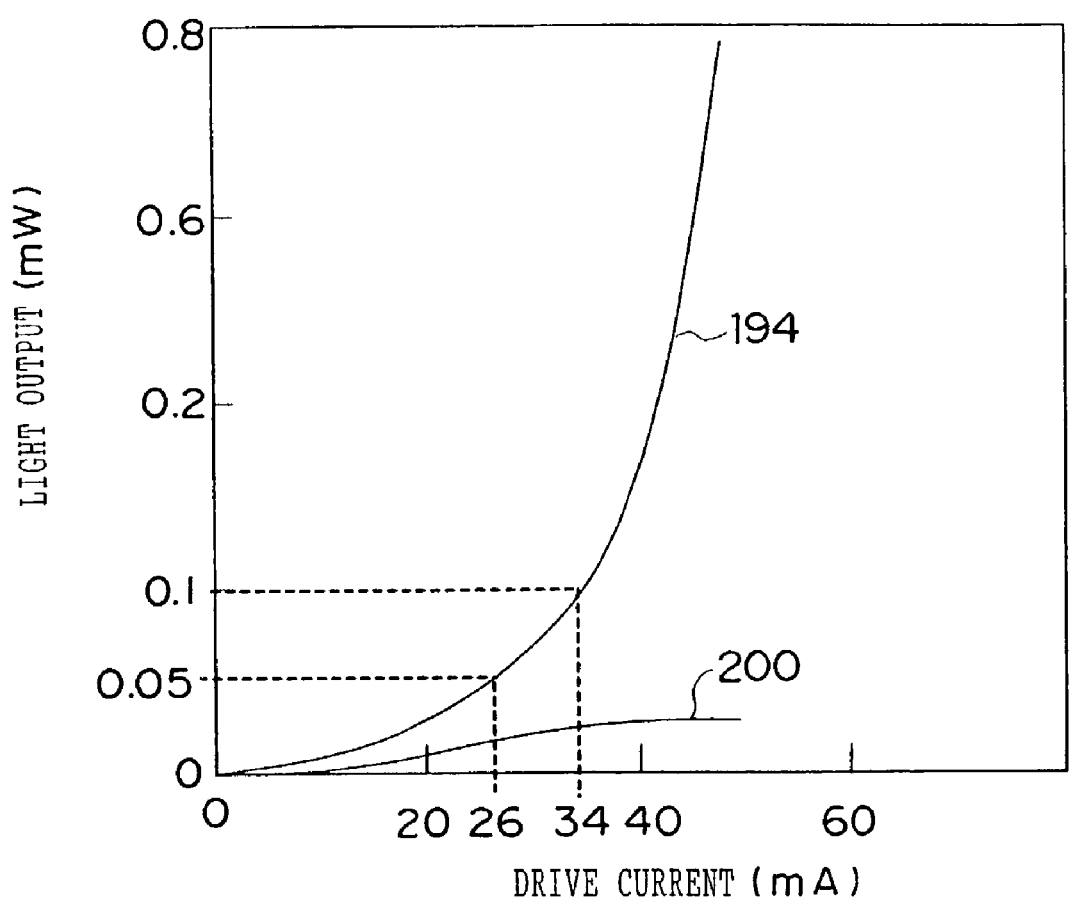
FIG. 10 is a graph showing both the relationship between the optical output of the spot and the drive current, and the relationship between the optical output of the blurred pattern and the drive current.

On the other hand, in such a case that such a laser beam whose optical output is equal to 0.1 mW is emitted, as shown in FIG. 10, a drive current of approximately 34 mW is required to be supplied to the B-laser light source 211B. In this case, light energy of a blurred pattern 200 with respect to the light energy of the spot 194 amounts to approximately 30%. In other words, as shown in FIG. 10, since there is such a tendency for the light energy of the blurred pattern 200 to be saturated in accordance with the increase of the drive current, the ratio of the blurred pattern 200 is increased in accordance with the decrease of the drive current, and also, the ratio of the blurred pattern 200 is decreased in accordance with the increase of the drive current.

Figure 13:
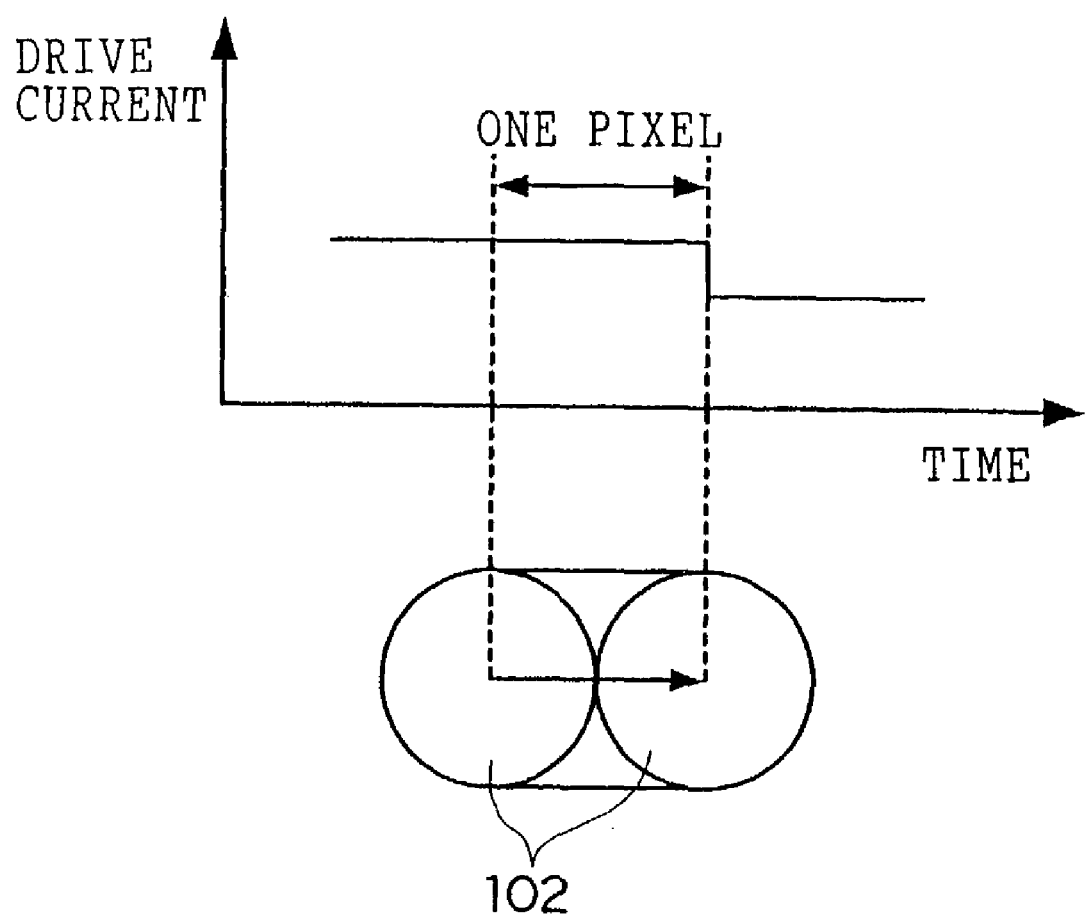
FIG. 13 is a diagram showing the relationship between the laser drive current and the beam spot in the prior art.

In general, when respective pixels of an image are formed, as shown in FIG. 13, a drive current is normally set to a constant current within scanning time of a single pixel, namely within a time period during which a beam spot 101 is moved over a distance equal to a diameter of this beam spot 101. However, as explained above, since the ratio of the blurred pattern 200 is increased in accordance with the decrease of the drive current, the sharpness of the image would be lowered in such a case that a photosensitive material with continuous gradation such as a silver salt photograph is used where a small drive current is also employed.

Figure 14:
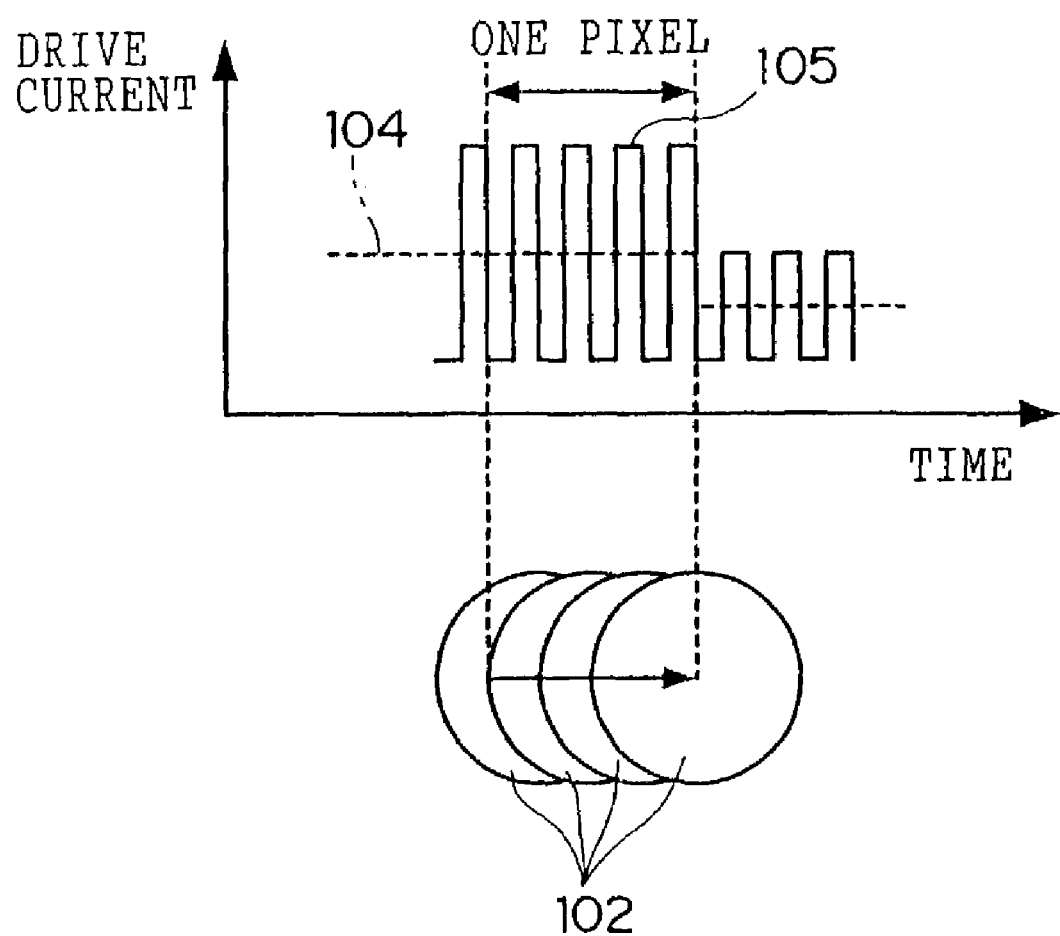
FIG. 14 is a diagram for showing a relationship between a laser drive current and a beam spot according to the embodiment of the invention.
Figure 15:
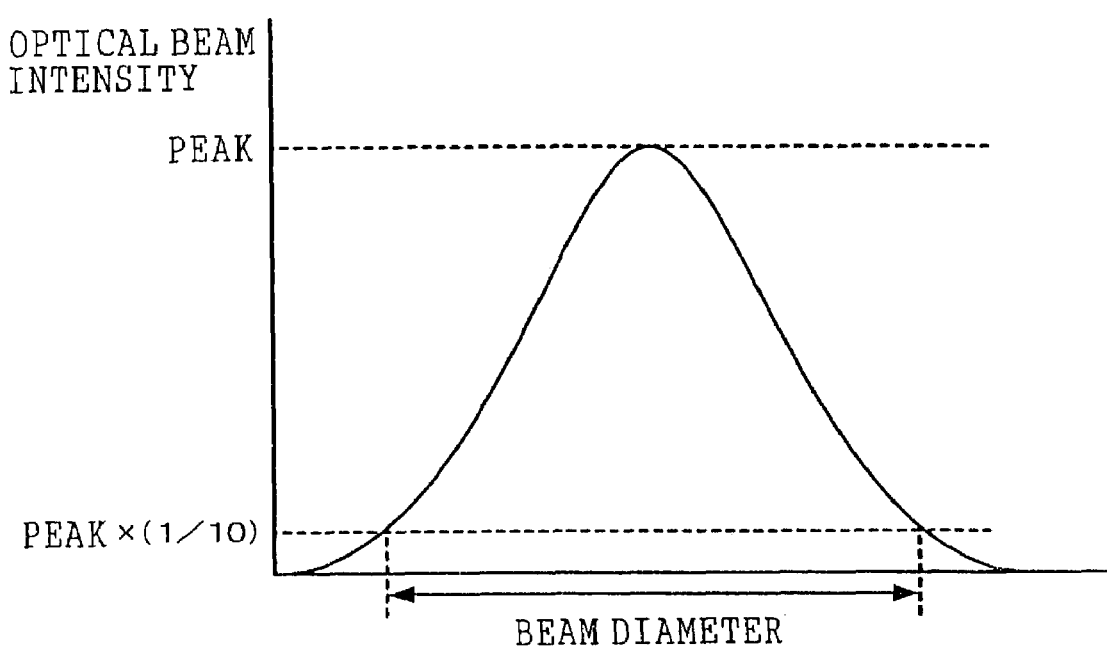
FIG. 15 is a schematic diagram showing a beam profile used to explain a diameter of a beam.

As a consequence, as represented in FIG. 14, the B-driving LD drive circuit 100 according to this second embodiment supplies both a higher drive current than a drive current 104 which should be originally supplied, and a lower drive current (containing drive current 105) than this drive current 104 at least one time within a time period during which the beam spot 101 is moved over the distance equal to the diameter of this beam spot 101. As a result, the beam spots 102 form a pixel while these beam spots 102 are overlapped with each other. It should also be noted that the diameter of the beam spot 101 is defined, for instance, as such a position where intensity becomes equal to 1/10 with respect to peak intensity of the beam spot 101, as represented in FIG. 15.

For example, in the case that the drive current 104 which should be originally supplied is equal to 26 mW, namely the optical output is equal to 0.05 mW, the B-driving LD drive circuit 100 alternately supplies both a drive current of 34 mW (optical output is 0.1 mW) higher than the drive current 104 which should be originally supplied, and also another drive current of 0 mW lower than the drive current 104. At this time, the supply time of the higher drive current is made substantially equal to the supply time of the lower drive current.

As a consequence, as shown in FIG. 13, in such a case that the drive current of 26 mW is continuously supplied within the scanning time for a single pixel, a ratio of a blurred pattern 200 amounts to 50%, so that a sharpness of an image would be lowered. However, as indicated in FIG. 14, since the B-driving LD drive circuit 100 alternately supplies both the drive current of 34 mW higher than the drive current 104 of 26 mW which should be originally supplied, and also another drive current of 0 mW lower than the drive current 104 at least one time within the scanning time for a single pixel, there is only such a case that the blurred pattern 200 occurs when the drive current of 34 mW higher than the drive current 104 is supplied. Also, in this case, since a ratio of this blurred pattern 200 is substantially equal to 30%, it is possible to suppress that the sharpness of the image is lowered. It should also be noted that in the above-described case, since such a drive current whose optical output becomes 0.1 mW is intermittently supplied only for a time duration equal to ½ scanning time for a single pixel, an average value of light energy becomes similar to that of FIG. 13, and thus, no specific change is made in an image to be formed.

It should also be noted that the above-explained control operation may be carried out only in such a case that a drive current to be used is lower than, or equal to a predetermined value. For example, only in such a case that a drive current to be used is lower than, or equal to such a drive current by which a ratio of a blurred pattern becomes 50%, as shown in FIG. 14, such a control operation may be carried out in a manner that both the drive current higher than the drive current which should be originally supplied, and also the drive current lower than this originally supplied drive current are alternately supplied at least one time, whereas in such a case that a drive current to be used is higher than such a drive current by which a ratio of a blurred pattern becomes larger than 50%, such a control operation is carried out in a manner that the drive current is set to a constant current as indicated in FIG. 13. As a result, proper control operations may be carried out in response to the drive current to be used.

Figure 16:
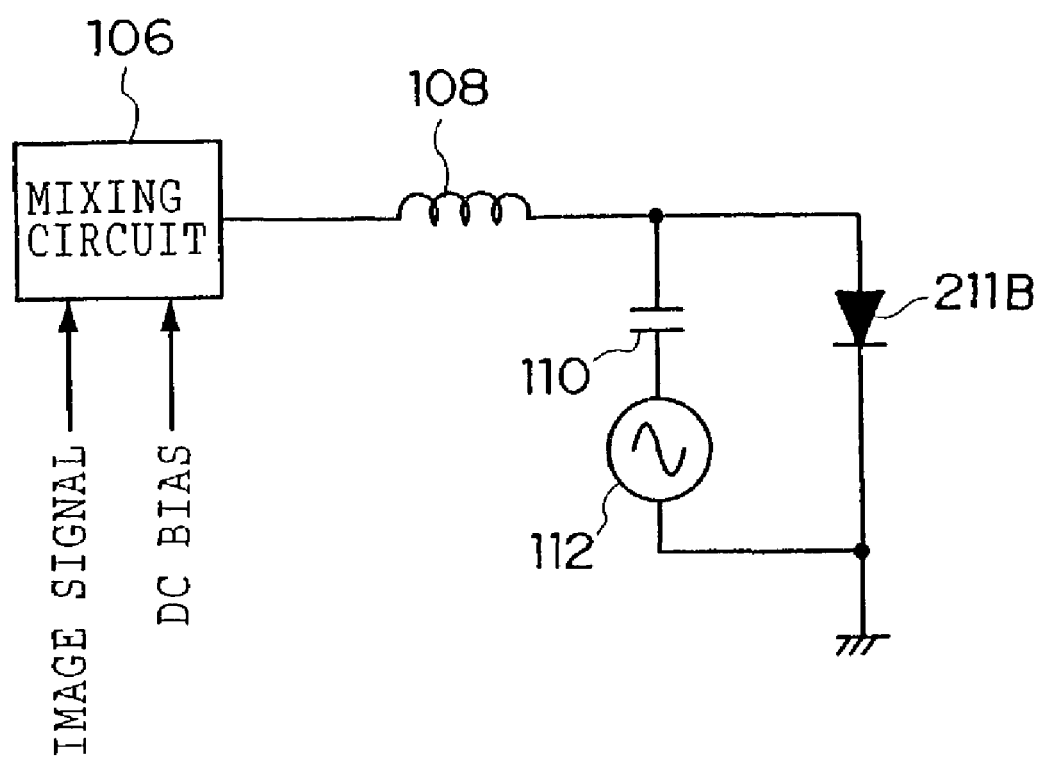
FIG. 16 is a schematic diagram showing an arrangement of an LD drive circuit.

FIG. 16 represents one example of the B-driving LD drive circuit 100, which is operated in such an operation manner. As indicated in FIG. 16, the B-driving LD drive circuit 100 is constituted by a mixing circuit 106, a coil 108, a capacitor 110, and a high frequency superimposing circuit 112.

The mixing circuit 106 outputs an image signal to the coil 108, while this image signal is produced by mixing an image signal outputted from the modulating circuit 90 with a DC bias signal. This image signal is such a signal corresponding to the drive current 104 shown in FIG. 14.

The high frequency superimposing circuit 112 outputs a high frequency signal having a predetermined frequency. This high frequency signal is superimposed on the image signal. In other words, the image signal is modulated by using the high frequency signal. This modulated signal is outputted as a drive signal to the B-laser light source 211B. This drive signal corresponds to the drive current 105 shown in FIG. 14.

It should be noted that the frequency of the high frequency signal is set in such a way that this high frequency becomes higher than, for instance, a pixel frequency "f (=1/T)" which is determined based upon scanning time "T" per a single pixel. As a consequence, the drive current higher than the drive current which should be originally supplied, and also the drive current lower than this originally supplied drive current are supplied at least one time.

Also, the frequency of the high frequency signal is set to such a frequency which is defined by multiplying the pixel frequency by a substantially integer value. For example, the frequency of this high frequency signal may be set to such a frequency that an error between this frequency and a frequency multiplied by an integer is smaller than, or equal to ±25%, preferably smaller than or equal to ±10%. As a result, an average value of light energy is substantially equal to that of FIG. 13, so that it is possible to avoid such a fact that deterioration of an image to be formed may become conspicuous.

In the laser printer unit 18 according to this second embodiment, with respect to the laser light sources 211R and 211B, the laser beams are modulated by modulating strengths of currents, which are applied to these laser light sources 211R and 211B. As a consequence, such laser beams which have been modulated in response to density of an image to be recorded on the photographic paper 224 is emitted from the laser light sources 211R and 211B, respectively. This laser beam is irradiated onto the photographic paper 224 via the collimator lens 213, the cylindrical lens 217, the polygon mirror 218, the fθ lens 220, the cylindrical lens 221, the cylindrical mirror 222, and the folding mirror 223.

In this case, as previously explained, since the laser light source 211B according to this second embodiment employs the GaN-based semiconductor laser, larger amounts of stray light than those of the semiconductor laser are emitted at the same time, so that the sharpness of the image recorded on the photographic paper 224 is adversely influenced. However, in accordance with this second embodiment, as previously described, the constant drive current is not supplied within the scanning time for a single pixel. Instead of this supply of the constant drive current, both the drive current higher than the drive current which should be originally supplied, and also the drive current lower than this originally supplied drive current are alternately supplied at least one time. As a consequence, while the average value of the light energy is maintained, the ratio of the blurred pattern can be lowered, and thus, it is possible to suppress such a fact that the sharpness of the image is lowered.

Figure 11A:
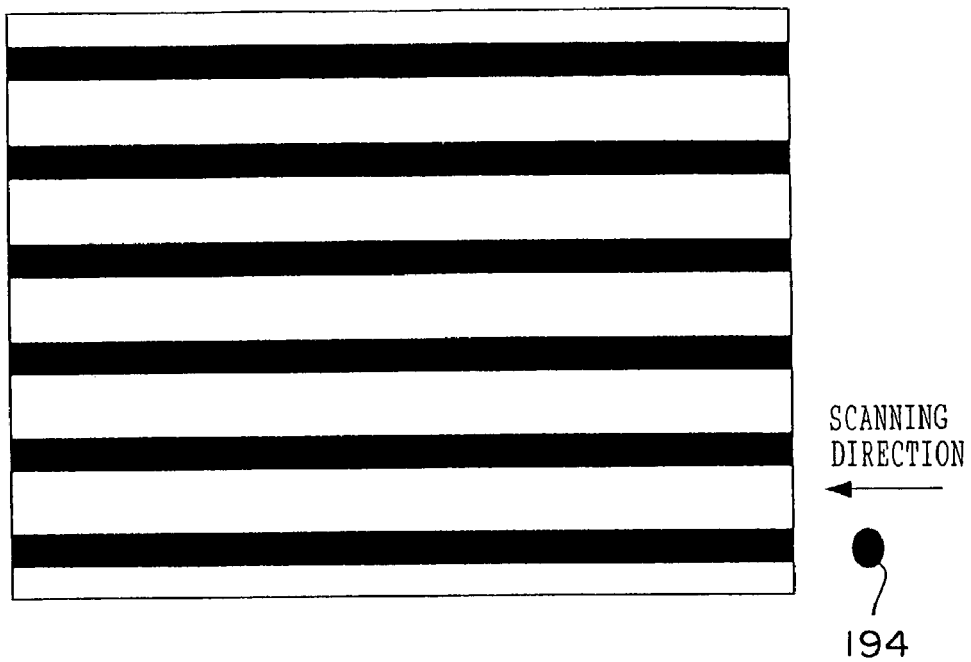
FIG. 11A is a diagram showing the stripe-shaped pattern.
Figure 11B:
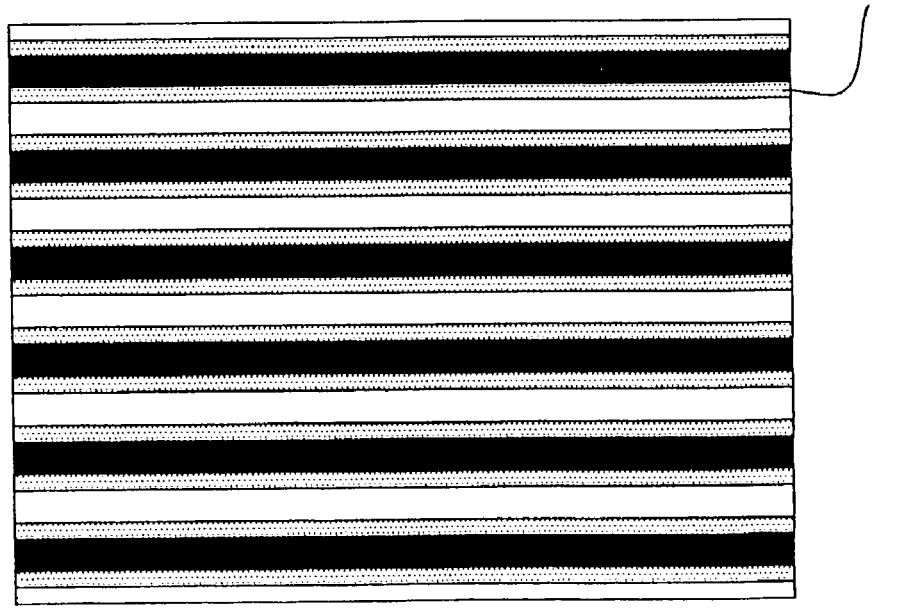
FIG. 11B is a diagram showing an example in which the blurred patterns are colored on the stripe-shaped pattern.
Figure 12A:
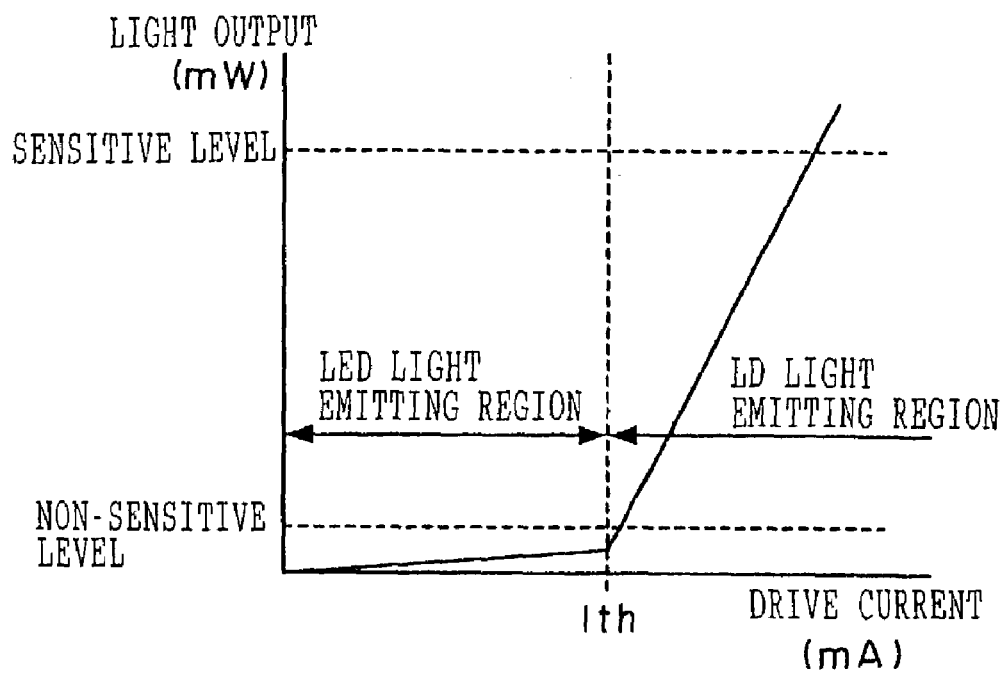
FIG. 12A is a graphic diagram showing the laser characteristic of the conventional laser light source.
Figure 12B:
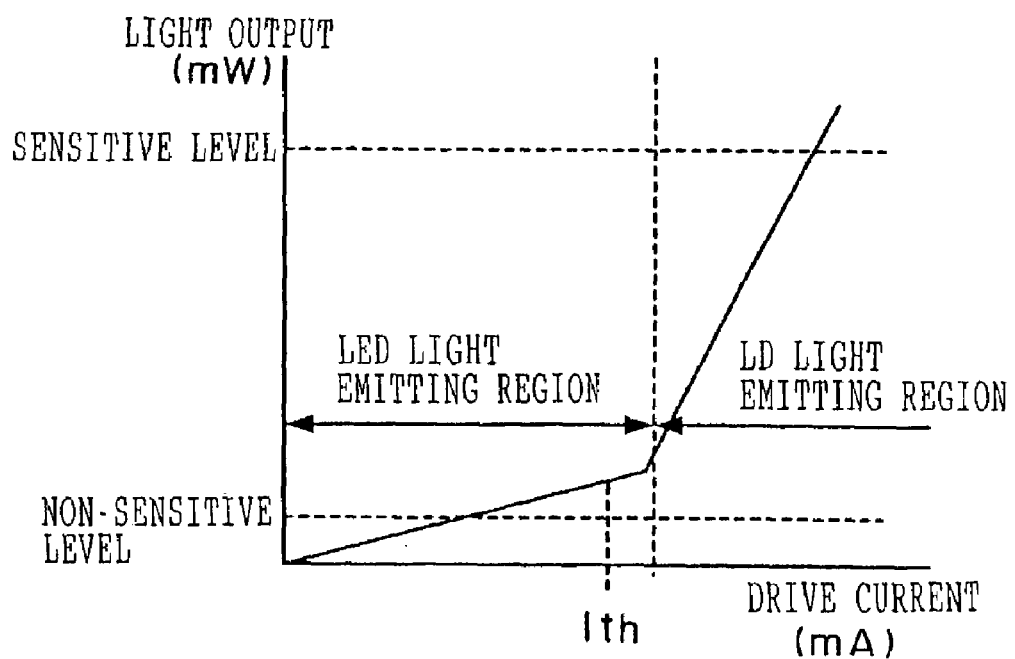
FIG. 12B is a graphic diagram showing the laser characteristic of the GaN-based laser light source.

As a consequence, in the case that an image to be recorded on the photographic paper 224 is, for instance, such a stripe-shaped image as shown in FIG. 11A, coloring effects occurred among the stripes can be suppressed, and thus, the image having the higher sharpness can be recorded.

It should also be noted that this second embodiment has described a case in which the invention is applied to the scanning optical system with employment of the polygon mirror. The invention is not limited to this case. Alternatively, the inventive idea of the invention may be applied to another scanning optical system using a galvanometer.

What is claimed is:

1. An image exposing apparatus comprising:
    a GaN-based semiconductor laser for emitting an optical beam, which includes laser light and emitted light other than the laser light;
    an optical system for focusing the optical beam onto a photosensitive material;
    a scanning and exposing component for scanning and exposing the photosensitive material with an optical beam, which has been modulated in accordance with image data to be recorded;
    an input component for inputting a type of the photosensitive material;
    a setting component for setting both a sensitive level at which the photosensitive material is sensitized and a non-sensitive level at which the photosensitive material is not sensitized in accordance with the type of the photosensitive material; and
    a driving component for driving the GaN-based semiconductor laser such that a light amount of an optical beam irradiated onto the photosensitive material becomes one of at least equal to the sensitive level and no more than equal to the non-sensitive level in accordance with the image data,
    wherein
    the setting component comprises:
    a ratio storage component for storing, in accordance with each type of the photosensitive material, a ratio of a first preset reference sensitive level, at which the photosensitive material is sensitized to a predetermined level, to a second preset reference sensitive level, at which the photosensitive material is not sensitized; and
    a sensitive level inputting component for inputting a measured sensitive level which is determined, based upon a colorimetry result of a test pattern recorded on the photosensitive material, such that the photosensitive material is sensitized; wherein,
    the setting component sets the measured sensitive level as the sensitive level, and calculates the non-sensitive level from both the sensitive level and the ratio corresponding to the type of the photosensitive material to set the calculated non-sensitive level.

2. The image exposing apparatus of claim 1, wherein the driving component drives the GaN-based semiconductor laser based on the sensitivity levels stored in the setting component.

3. The image exposing apparatus of claim 1, wherein the non-sensitive level is independently set for each type of photosensitive material.

4. An image exposing apparatus comprising:
    a GaN-based semiconductor laser for emitting an optical beam, which includes laser light and emitted light other than the laser light;
    an optical system for focusing the optical beam onto a photosensitive material;
    a scanning and exposing component for scanning and exposing the photosensitive material with an optical beam, which has been modulated in accordance with image data to be recorded;
    an input component for inputting a type of the photosensitive material;
    a setting component for setting both a sensitive level at which the photosensitive material is sensitized and a non-sensitive level at which the photosensitive material is not sensitized in accordance with the type of the photosensitive material;

a driving component for driving the GaN-based semiconductor laser such that a light amount of an optical beam irradiated onto the photosensitive material becomes one of at least equal to the sensitive level and no more than equal to the non-sensitive level in accordance with the image data;

a monitoring optical system for monitoring the optical beam; and a light receiving component for receiving an optical beam transmitted through the monitoring optical system; wherein, the monitoring optical system is arranged in such a manner that a component ratio of the laser light of the optical beam received by the light receiving component to the emitted light is substantially equal to a component ratio of the laser light received by the photosensitive material to the emitted light; and wherein, the driving component drives the GaN-based semiconductor laser in such a manner that a light amount of an optical beam received by the light receiving component becomes equal to one of the sensitive level and the non-sensitive level.

5. An image exposing method comprising the steps of:
emitting an optical beam, which contains laser light and emitted light other than the laser light;
focusing the optical beam to a photosensitive material;
scanning and exposing the photosensitive material with an optical beam which has been modulated in response to image data to be recorded;
inputting a type of the photosensitive material;
setting a sensitive level at which the photosensitive material is sensitized and a non-sensitive level at which the photosensitive material is not sensitized in accordance with the type of the photosensitive material; and
driving the optical beam such that a light amount of an optical beam irradiated to the photosensitive material becomes one of at least equal to the sensitive level, and no more than equal to the non-sensitive level in accordance with the image data,
wherein
the setting step comprises the steps of;
storing a ratio of a first preset reference sensitive level, at which the photosensitive material is sensitized by a predetermined level, to a second preset reference sensitive level, at which the photosensitive material is not sensitized, in accordance with the type of the photosensitive material;
inputting a measuring sensitive level, which is determined based upon a colorimetry result of a test pattern recorded on the photosensitive material, such that the photosensitive material is sensitized by a predetermined level; and
setting the measuring sensitive level as the sensitive level, and calculating and setting the non-sensitive level from both the ratio and the sensitive level corresponding to the type of the photosensitive material.

6. The image exposing method of claim 5, wherein the driving of the optical beam is based on sensitivity levels stored in a setting component.

7. The image exposing method of claim 5, wherein the sensitive level is stored in a setting component.

8. The image exposing method of claim 5, wherein the non-sensitive level is independently set for each type of photosensitive material.

9. An image exposing method comprising the steps of:
emitting an optical beam, which contains laser light and emitted light other than the laser light;
focusing the optical beam to a photosensitive material;
scanning and exposing the photosensitive material with an optical beam which has been modulated in response to image data to be recorded;
inputting a type of the photosensitive material;
setting a sensitive level at which the photosensitive material is sensitized and a non-sensitive level at which the photosensitive material is not sensitized in accordance with the type of the photosensitive material;
driving the optical beam such that a light amount of an optical beam irradiated to the photosensitive material becomes one of at least equal to the sensitive level, and no more than equal to the non-sensitive level in accordance with the image data;
monitoring the optical beam with a monitoring optical system; and
receiving an optical beam transmitted through the monitoring optical system; wherein,
a component ratio of the laser light to the emitted light of the received optical beam is arranged to be substantially equal to the component ratio of the laser light received by the photosensitive material to the emitted light; and
the optical beam is driven in such a manner that a light amount of the received optical beam becomes equal to one of the sensitive level and the non-sensitive level.

10. An image exposing apparatus comprising:
a GaN-based semiconductor laser for emitting an optical beam, which includes laser light and emitted light other than the laser light;
an optical system for focusing the optical beam onto a photosensitive material;
a scanning and exposing component for scanning and exposing the photosensitive material with an optical beam, which has bean modulated in accordance with image data to be recorded;
an input component for inputting a type of the photosensitive material;
a setting component for setting both a sensitive level at which the photosensitive material is sensitized and a non-sensitive level at which the photosensitive material is not sensitized in accordance with the type of the photosensitive material; and
a driving component for driving the GaN-based semiconductor laser such that a light amount of an optical beam irradiated onto the photosensitive material becomes one of at least equal to the sensitive level and no more than equal to the non-sensitive level in accordance with the image data,
wherein the setting component comprises:
a ratio storage component for storing, in accordance with each type of the photosensitive material, a ratio of a first preset reference sensitive level, at which the photosensitive material is sensitized to a predetermined level, to a second preset reference sensitive level, at which the photosensitive material is not sensitized.

11. An image exposing method comprising the steps of:
emitting an optical beam, which contains laser light and emitted light other than the laser light;
focusing the optical beam to a photosensitive material;
scanning and exposing the photosensitive material with an optical beam which has been modulated in response to image data to be recorded;
inputting a type of the photosensitive material;

setting a sensitive level at which the photosensitive material is sensitized and a non-sensitive level at which the photosensitive material is not sensitized in accordance with the type of the photosensitive material; and driving the optical beam such that a light amount of an optical beam irradiated to the photosensitive material becomes one of at least equal to the sensitive level, and no more than equal to the non-sensitive level in accordance with the image data, wherein the setting step comprises;

storing a ratio of a first preset reference sensitive level, at which the photosensitive material is sensitized by a predetermined level, to a second preset reference sensitive level, at which the photosensitive material is not sensitized, in accordance with the type of the photosensitive material.

* * * * *